US 9,582,529 B2

(12) United States Patent
Bruestle

(10) Patent No.: US 9,582,529 B2
(45) Date of Patent: Feb. 28, 2017

(54) METHOD AND SYSTEM FOR SORTING DATA IN A CLOUD-COMPUTING ENVIRONMENT AND OTHER DISTRIBUTED COMPUTING ENVIRONMENTS

(71) Applicant: Spiral Genetics Inc., Seattle, WA (US)

(72) Inventor: Jeremy Bruestle, Seattle, WA (US)

(73) Assignee: Spiral Genetics, Inc., Seattle, WA (US)

( * ) Notice: Subject to any disclaimer, the term of this patent is extended or adjusted under 35 U.S.C. 154(b) by 282 days.

(21) Appl. No.: 13/912,135

(22) Filed: Jun. 6, 2013

(65) Prior Publication Data

US 2013/0346425 A1    Dec. 26, 2013

Related U.S. Application Data

(60) Provisional application No. 61/656,426, filed on Jun. 6, 2012.

(51) Int. Cl.
| | | |
|---|---|---|
| *G06F 17/30* | (2006.01) | |
| *G06F 9/50* | (2006.01) | |
| *G06F 7/36* | (2006.01) | |
| *G06F 7/32* | (2006.01) | |

(52) U.S. Cl.
CPC ......... *G06F 17/30345* (2013.01); *G06F 7/32* (2013.01); *G06F 7/36* (2013.01); *G06F 9/5066* (2013.01)

(58) Field of Classification Search
CPC ................................................ G06F 17/30345
USPC ....................................................... 707/752
See application file for complete search history.

(56) References Cited

U.S. PATENT DOCUMENTS

| 5,307,485 A * | 4/1994 | Bordonaro et al. |
| 5,421,007 A * | 5/1995 | Coleman ................... G06F 7/32 |
| 5,842,207 A | 11/1998 | Fujiwara et al. |
| 8,484,279 B1 * | 7/2013 | Cole ............................ 709/201 |
| 2003/0177161 A1 | 9/2003 | Rothschild et al. |
| 2007/0226226 A1 * | 9/2007 | Mintz ............................. 707/10 |

(Continued)

FOREIGN PATENT DOCUMENTS

WO    2011120791 A1    10/2011

OTHER PUBLICATIONS

Bitton et al., A Taxonomy of Parallel Sorting, Computer Surveys, vol. 16, No. 3, Sep. 1984, pp. 287-318.*

(Continued)

*Primary Examiner* — Jensen Hu
(74) *Attorney, Agent, or Firm* — Han Santos, PLLC

(57) ABSTRACT

The current document is directed to a method and system for data processing in cloud-computing environments and other distributed-computing environments. Implementations of a merge sort suitable for the sorting of data within cloud-computing environments and other distributed-computing environments are disclosed. These implementations takes advantage of the massive parallelism available in cloud-computing environments as well as take into consideration numerous constraints regarding data-storage and data-retrieval operations in a cloud-computing environment. The implementations provide a type of data-sorting method and system that iteratively carries out highly parallel merge-sort operations that can be effectively applied over a range of data-set sizes up to extremely large data sets.

16 Claims, 33 Drawing Sheets

(56) References Cited

U.S. PATENT DOCUMENTS

| | | |
|---|---|---|
| 2008/0086442 A1 | 4/2008 | Dasdan et al. |
| 2010/0031003 A1* | 2/2010 | Chen et al. .................... 712/30 |
| 2011/0004521 A1 | 1/2011 | Behroozi et al. |
| 2014/0052711 A1* | 2/2014 | Bamba .............. G06F 17/30241 |
| | | 707/718 |
| 2016/0253405 A1* | 9/2016 | Heyns .............. G06F 17/30466 |

OTHER PUBLICATIONS

Jeon et al., Parallel Merge Sort with Load Balancing, International Journal of Parallel Programming, vol. 31, No. 1, Feb. 2003, pp. 21-33.*

"International Search Report and Written Opinion" for PCT/US2013/044615, mailed Nov. 19, 2013, 8 pages.

"International Preliminary Report on Patentability" for PCT/US2013/044615, mailed Dec. 9, 2014, 6 pages.

* cited by examiner

```
boolean lessThan (char* key1, char* key2)
{
    bool res;
    char* ln1 = key1;
    char* ln2 = key2;
    while (*key1 != ',') key1++;
    *(key1 – 1) = 0;
    while (*key2 != ',') key2++;
    *(key2 – 1) = 0;
    res = compare (ln1, ln2);
    if (res == -1) return true;
    else if (res == 1) return false;
    else
    {
        res = compare (key1, key2);
        if (res == -1) return true;
        else return false;
    }
} boolean compare (char* s1, char* s2)
{
    do
    {
        if (*s1 < *s2) return -1;
        else if (*s2 < *s1) return 1;
        else
        {
            s1++;
            s2++;
            if (*s1 == 0)
            {
                if (*s2 != 0) return -1;
                else return 0;
            }
            else if (*s2 == 0) return 1;
        }
    }
}
```

FIG. 2B

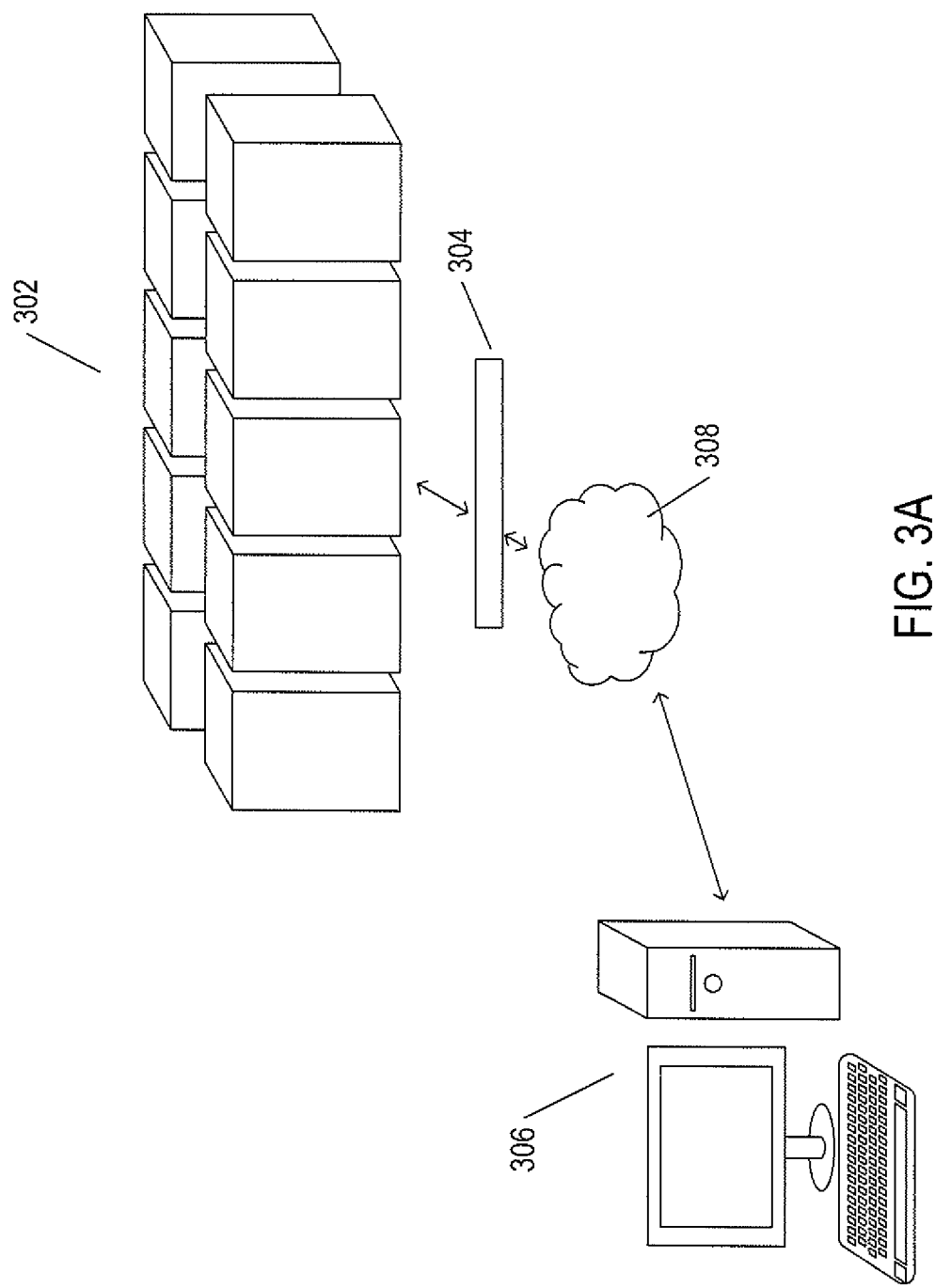

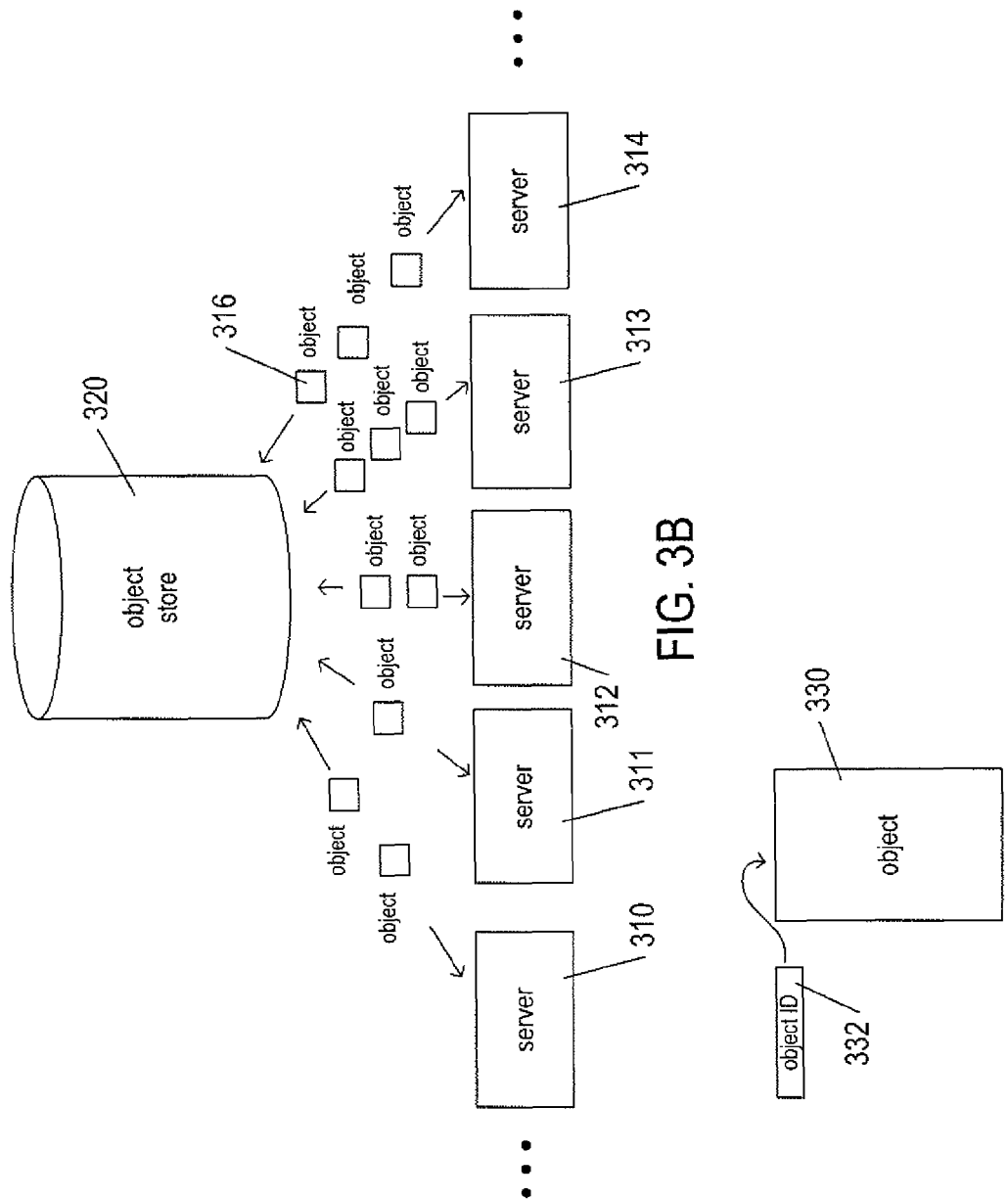

METHOD AND SYSTEM FOR SORTING DATA IN A CLOUD-COMPUTING ENVIRONMENT AND OTHER DISTRIBUTED COMPUTING ENVIRONMENTS

CROSS-REFERENCE TO RELATED APPLICATION

This application claims the benefit of Provisional Application No. 61/656,426, filed Jun. 6, 2012.

TECHNICAL FIELD

The current document is directed to methods and systems for sorting data and, in particular, to data sorting within cloud-computing and other distributed computing environments.

BACKGROUND

Many of the classical computational methods related to data processing, data storage, and information retrieval were developed during an era in which even large computer systems were generally based on a single processor and directly connected data-storage devices and other peripheral devices. Data processing in such systems is sequential in nature, as a result of which many of the classical data-processing methods are inherently sequential, in nature, and fail to take advantage of parallel processing. As computer networking and distributed computer systems evolved, during the past 30 years, new types of computational methods have evolved to take advantage of the enormous computational bandwidths that are possible when a computational task is partitioned and distributed among a large number of concurrently executing processors and individual computational systems. More recently, the emergence of cloud computing has yet again changed the underlying constraints, capabilities, and dynamics associated with computational resources. As a result, new opportunities are emerging for the development of new types of computational methods and systems implemented within cloud-computing environments and other types of distributed computing environments.

SUMMARY

The current document is directed to a method and system for data processing in cloud-computing environments and other distributed-computing environments. Implementations of a merge sort suitable for the sorting of data within cloud-computing environments and other distributed-computing environments are disclosed. These implementations takes advantage of the massive parallelism available in cloud-computing environments as well as take into consideration numerous constraints regarding data-storage and data-retrieval operations in a cloud-computing environment. The implementations provide a type of data-sorting method and system that iteratively carries out highly parallel merge-sort operations that can be effectively applied over a range of data-set sizes up to extremely large data sets.

BRIEF DESCRIPTION OF THE DRAWINGS

FIGS. 2A-C illustrate, in greater detail, the currently disclosed cloud merge sort.

FIGS. 3A-D illustrate the cloud-computing environment in which the described implementations of the cloud merge sort execute to sort records stored in a virtual data-storage subsystem provided to cloud-computing-environment users.

DETAILED DESCRIPTION

Figure 1A:
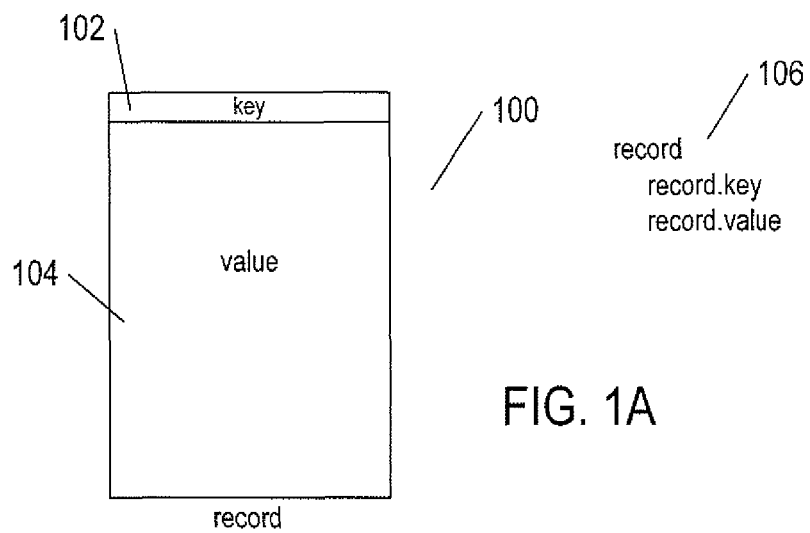
FIGS. 1A-B illustrate the fundamental data unit considered in the following descriptions of implementations of the currently disclosed method and system for data sorting.

The current document is directed to data-sorting methods and systems suitable for execution within cloud-computing environments and other distributed-computing environments. Various implementations of these methods and systems are discussed below using detailed illustrations, control-flow diagrams, and an example C++ implementation.

It should be noted, at the onset, that the currently disclosed methods and systems are directed to real, tangible, physical systems and methods carried out within physical systems, including client computers and server computers. Those familiar with modern science and technology well appreciate that, in modern computer systems and other processor-controlled devices and systems, the control components are often fully or partially implemented as sequences of computer instructions that are stored in one or more electronic memories and, in many cases, also in one or more mass-storage devices, and which are executed by one or more processors. As a result of their execution, a processor-controlled device or system carries out various operations, generally at many different levels within the device or system, according to control logic implemented in the stored and executed computer instructions. Computer-instruction-implemented control components of modern processor-controlled devices and systems are as tangible and physical as any other component of the system, including power supplies, cooling fans, electronic memories and processors, and other such physical components.

In the following discussion, the phrases "cloud computing" and "cloud-computing environment" are used to describe, in general terms, the large number of relatively new, computing-as-a-utility distributed-computing facilities that allow users to configure remote, virtual computing systems and data centers and execute various types of computational tasks within these remote computer systems and data centers. In general, cloud-computing facilities provide users with virtual systems and data centers mapped to actual physical server computers, data-storage subsystems, and other remote physical data-center components. Users may dynamically add computational bandwidth and data-storage capabilities and dynamically return unused computational bandwidth and data-storage capacity in order to respond to dynamically changing computational loads in a cost-effective manner. Users of cloud-computing facilities essentially rent underlying physical facilities, allowing the users to concentrate on developing and deploying service applications and other programs without worrying about assembling and maintaining physical data centers and without needing to purchase and maintain large computational facilities to handle peak loads that, during non-peak periods, lay idle while incurring power, maintenance, and physical-housing costs.

Although there are many different types of cloud-computing facilities and environments, many of the cloud-computing environments have certain commonly shared characteristics. For example, because a physical location of a user's virtual system or data center is dynamic within a cloud-computing facility, cloud-computing facilities generally provide virtual data-storage subsystems for long-term data storage. Thus, long-term data storage is generally decoupled from computation in many cloud-computing environments.

In many cloud-computing environments, data is stored within relatively large objects similar to files in a traditional computer system. These objects are associated with unique identifiers that allow the objects to be reliably stored in a data-storage subsystem and subsequently retrieved. The objects are generally written sequentially and can only be updated by rewriting the entire object, and are read into the memory of a physical or virtual server or other computer system for random access. In general, any cloud-computing-facility server or other computer system may be authorized to access any data object stored within the data-storage subsystem of a cloud-computing facility. Cloud-computing facilities provide interfaces that allow users to allocate, start, and stop virtual servers and systems within the cloud and to launch particular computational tasks on the allocated servers and other virtual systems.

Figure 1B:
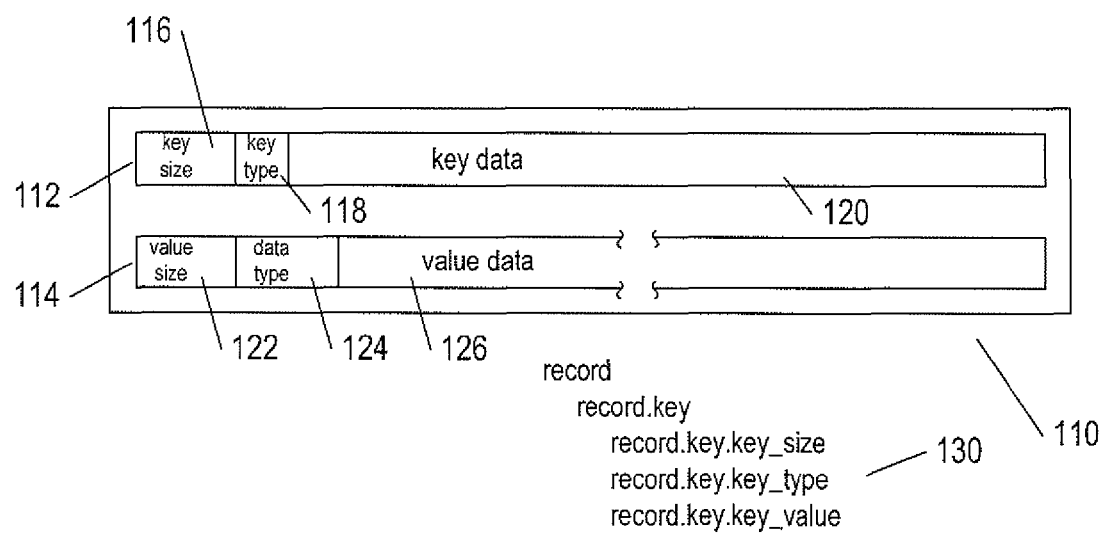

FIGS. 1A-B illustrate the fundamental data unit considered in the following descriptions of implementations of the currently disclosed method and system for data sorting. In the following discussion, these implementations are referred to as the "cloud merge sort," although, as mentioned above, these methods and systems are suitable not only for cloud-computing environments but also for many other different types of distributed-computing environments. FIG. 1A shows a record 100 that consists of a key, or key value, 102 and a value, or data value, 104. To be precise, the key and the value are two different portions of a number of bytes that together constitute the record. The bytes that together compose the key are interpreted as a key value. For example, a sequence of successive bytes that compose the key may be variously interpreted as a symbol string, an integer, a floating-point number, or any of other such data types or may constitute a sub-record containing multiple different fields with associated values. The non-key portion of the record is the value or data value of the record, the term "value" and the phrase "data value" used interchangeably in the following discussion. One type of notation for presenting a record 106 is also shown in FIG. 1A.

Records may have significantly more complex internal structures. As one example, FIG. 1B shows a record 110 in which the key 112 and value 114 are, themselves, subrecords, or multi-field objects. In the record shown in FIG. 110, the key 112 includes an indication of the size of the key 116, an indication of the data type of the key value 118, and the key value 120 by which records are ordered by a cloud-merge-sort operation. Similarly, the value 114 includes a value size 122, a data type 124, and the value data 126. Notation describing this more complex record 130 is also included in FIG. 1B. The fields and subfields within a record may be fixed length or variable length, depending on the particular type of record and record definition. For example, the record type shown in FIG. 1B features a variable-length key value and variable-length value data with fixed-length metadata fields that describe the overall size of the key, the data type of the key value, the overall size of the value, and the data type of the value data. The value portion of a record may include an arbitrary hierarchical organization of subrecords with various fixed and variable-length fields. However, for the sake of clarity and brevity, the current document assumes a simple record, such as that shown in FIG. 1A, that includes a key by which records are sorted and a value that is composed of one or more bytes of information. The currently disclosed methods and systems can be adapted for sorting any type of record that includes at least a key value on which the records are sorted.

Figure 2A:
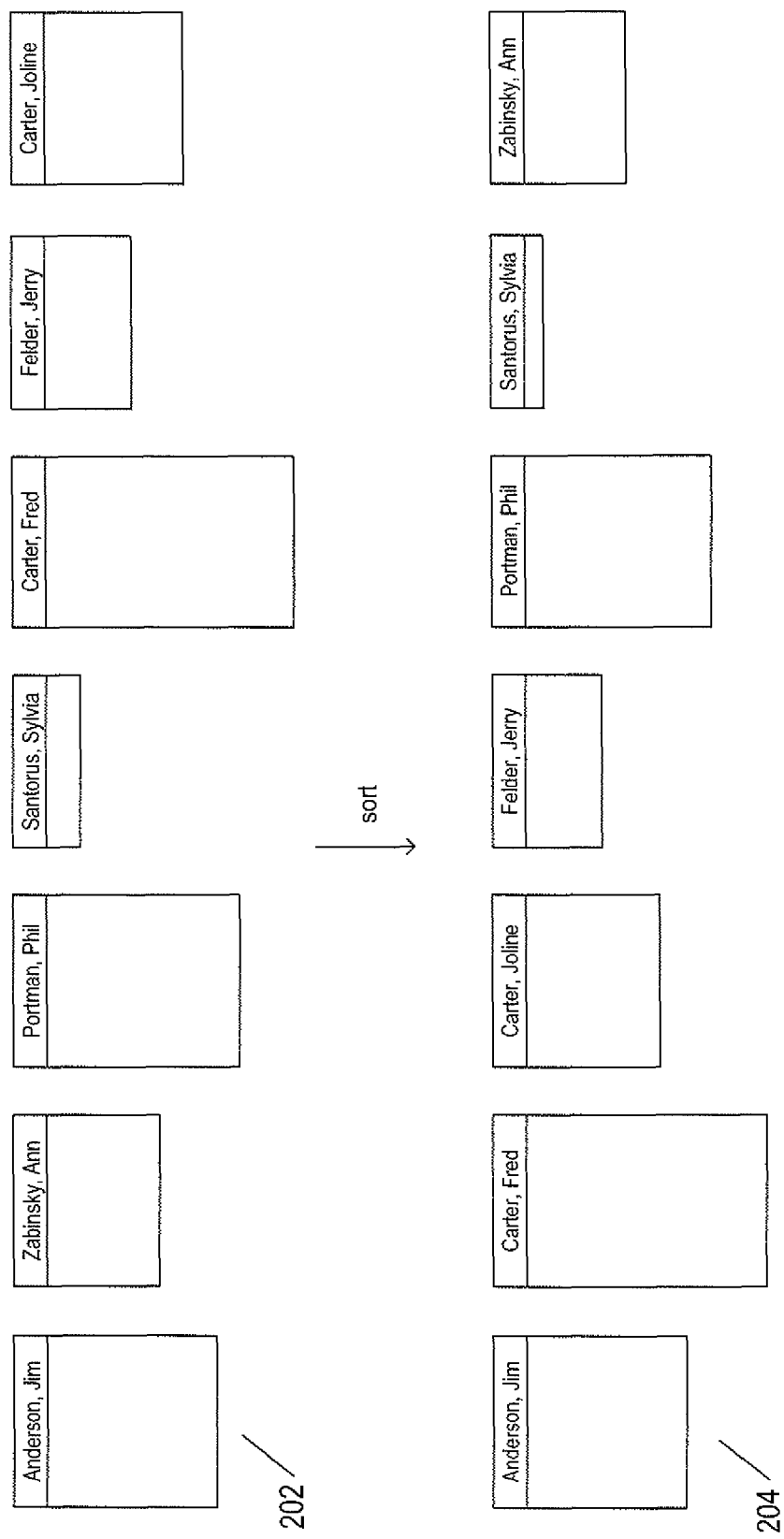
Figure 2C:
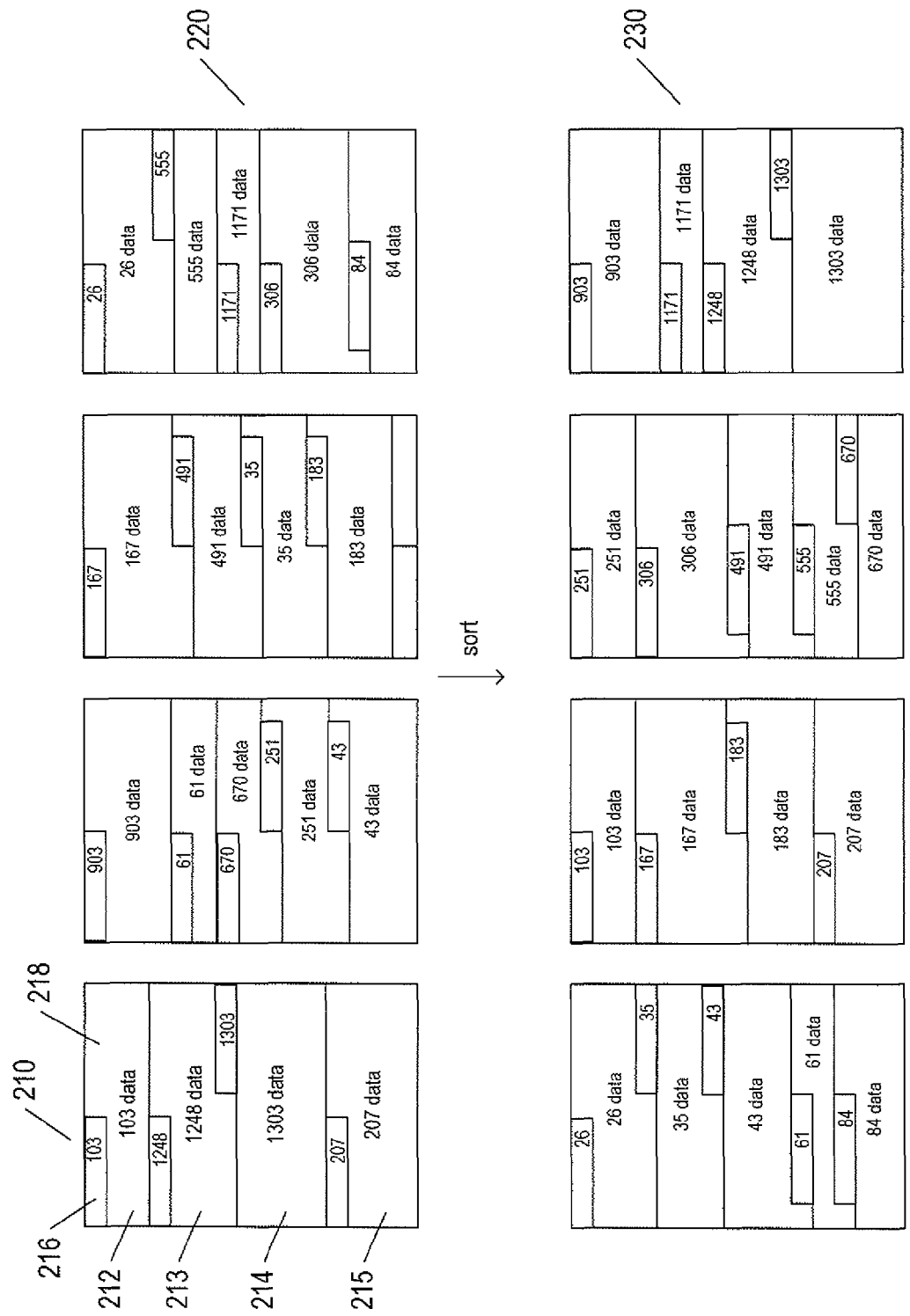

FIGS. 2A-C illustrate, in greater detail, the currently disclosed cloud merge sort. As shown in FIG. 2A, a fundamental goal of the sorting operation, such as the cloud merge sort, is to sort a set of records 202 by key value into an ordered sequence of sorted records 204. In the example shown in FIG. 2A, the key values are symbol-string representations of the names of people and the sort operation arranges the records in lexicographic or dictionary-like order, sorted first with respect to the last name and secondarily with respect to the first name. The currently disclosed cloud merge sort assumes that key values can be ordered by a relational operator, such as the operator less-than, "<." FIG. 2B shows a simple C-like implementation of a less-than operator that takes two character strings as arguments, key1 and key2, that each represents a comma-delimited last-name/first-name pair. Providing that, however complex a key value is defined to be, a relational-operator function, such as less-than, can be implemented for the key values of a set of records, the cloud merge sort can be used to sort the records based on the key value. In the example shown in FIG. 2A, the sorting operation is two-dimensional, one dimension being the last name and a different dimension being the first name.

FIG. 2C illustrates the data structures manipulated by the described implementations of the cloud merge sort. As shown in FIG. 2C, the cloud merge sort operates on data records, as discussed above with reference to FIG. 2A, with the data records contained within larger data objects, or blocks. It is the data objects, or blocks, that represent the fundamental units of data storage provided by data-storage subsystems provided within cloud-computing facilities. In one example shown in FIG. 2C, block 210 includes the four data records 212-215. Each data record includes an integer key, such as key "103" 216 within record 212 and a variable length value, or data, such as value 218 within record 212. As shown in FIG. 2C, the cloud merge sort sorts a sequence of records contained in a set of blocks into a sequential, sorted set of records contained within the set of blocks. The records in the top set of blocks 220 are unsorted while the records in the bottom set of blocks 230 are sorted in increasing, or ascending, key order. The cloud merge sort can be used to sort records in ascending, descending, or more complex orders, where the ordering of records produced by the cloud merge sort is defined by the implementation of a relational operator used to compare pairs of record keys during cloud-merge-sort internal operations.

FIGS. 3A-D illustrate the cloud-computing environment in which the described implementations of the cloud merge sort execute to sort records stored in a virtual data-storage subsystem provided to cloud-computing-environment users.

The cloud-computing environment includes a remote physical data-processing center 302 which provides a virtual system or virtual data center interface 304 to users who access the cloud-computing facility through personal computers, servers, or other computer systems 306 interconnected with the cloud-computing facility via various types of local and wide-area networking, often including the Internet 308. The cloud-computing facility provides, to users, the ability to launch programs and other computing tasks, as shown in FIG. 3B, on a number of server systems or other virtual computer systems 310-314, each of which can store and retrieve data objects, or blocks, such as block 316, to and from the data-storage subsystem, or object store 320 provided within the cloud-computing environment. As shown in FIG. 3C, each data object, or block, includes the object data 330 as well as an object ID 332 associated with the object that uniquely identifies the object and serves as a label, or identifier, using which the data object can be stored to and retrieved from the object store by a virtual server or other computing entity. The object ID may be at least unique among the virtual systems and data centers allocated to a particular user for a particular task for some particular time period, and may be globally unique among all users and computational tasks associated with a cloud-computing facility.

Figure 3D:
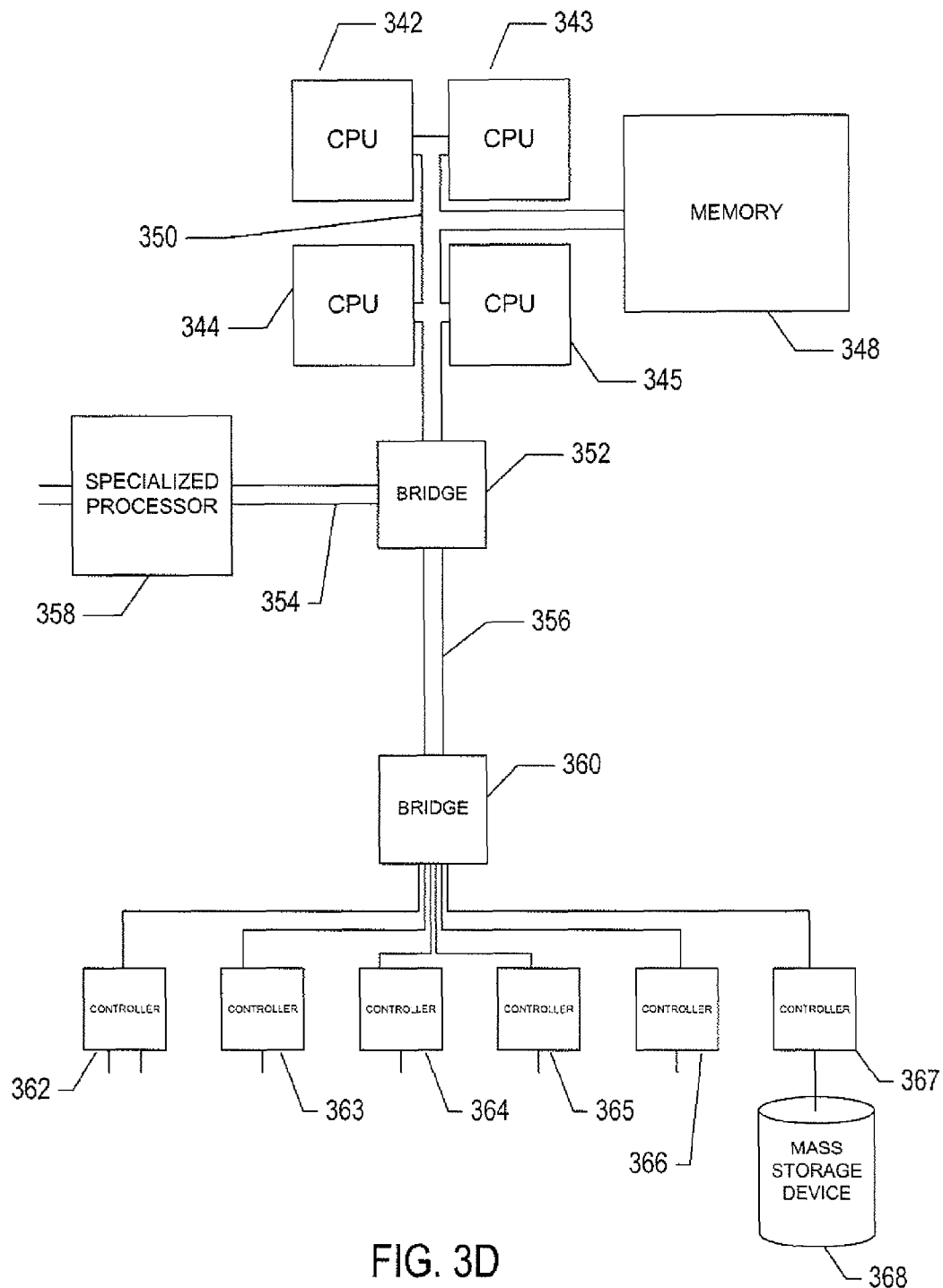

FIG. 3D provides a general architectural diagram for various types of computers, including those used in cloud-computing environments. The computer system contains one or multiple central processing units ("CPUs") 342-345, one or more electronic memories 3488 interconnected with the CPUs by a CPU/memory-subsystem bus 350 or multiple busses, a first bridge 352 that interconnects the CPU/memory-subsystem bus 350 with additional busses 354 and 356, or other types of high-speed interconnection media, including multiple, high-speed serial interconnects. These busses or serial interconnections, in turn, connect the CPUs and memory with specialized processors, such as a graphics processor 358, and with one or more additional bridges 360, which are interconnected with high-speed serial links or with multiple controllers 362-367, such as controller 367, that provide access to various different types of mass-storage devices 368, electronic displays, input devices, and other such components, subcomponents, and computational resources.

Figure 4:
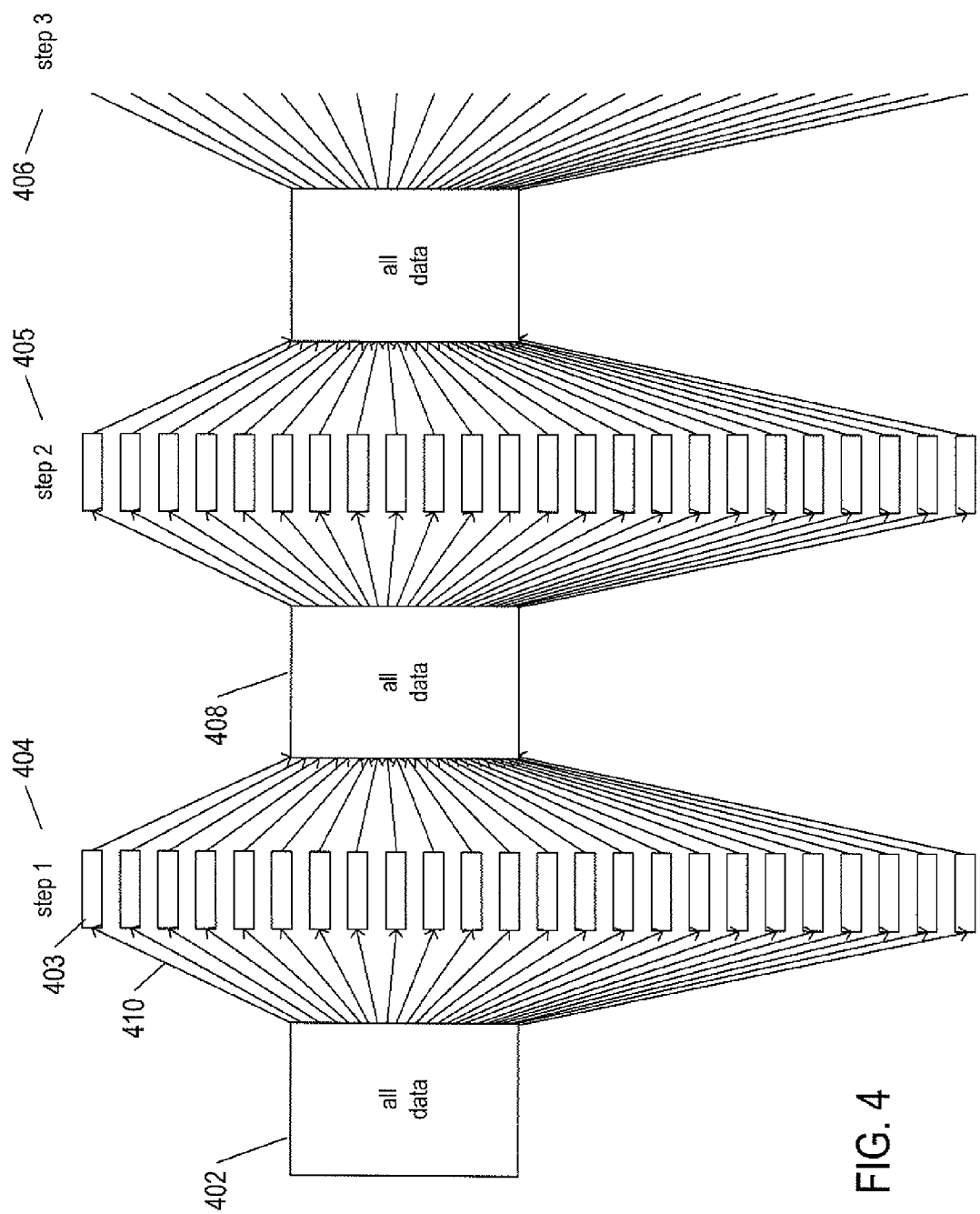
FIG. 4 illustrates the basic execution flow within the currently disclosed cloud merge sort.

FIG. 4 illustrates the basic execution flow within the currently disclosed cloud merge sort. The cloud merge sort starts with an entire data set comprising a number of blocks, each containing a number of records, which are generally initially unsorted 402. In each of a series of steps (404-406 in FIG. 4), only a few of which are shown in FIG. 4, the set of blocks containing the records of the data set is partitioned into subsets which are each distributed to a different computational resource within the cloud-computing facility. Thus, in FIG. 4, the initial data set 402 is partitioned into data subsets, such as data subset 403, each of which is distributed to a computational entity or resource within the cloud-computing facility for sorting. When the subsets have been sorted, they are collected together again into a generally partially sorted intermediate data set 408 and then repartitioned and redistributed among computational resources to carry out a next cloud-merge-sort step 405. This process of fanning out data subsets and re-collecting sorted data subsets continues iteratively until the keys or key values in each subset are sorted and do not overlap the keys of other subsets, with the exception of overlap at the beginnings and ends of adjacent blocks containing multiple records with identical key values.

The basic computational flow illustrated in FIG. 4 takes advantage of the characteristics of cloud-computing facilities. Each step results in a highly parallel sorting of many data subsets in order to achieve high computational throughput for the cloud merge sort. Because block writes and block reads, in a cloud-computing environment, may be associated with relatively large latencies, the block reads and writes are also highly paralyzed, with each task carrying out only a relatively small number of block reads and block writes during each cycle, or step. The cloud merge sort is designed to minimize the total number of steps needed in order to fully sort the initial data set, and generally achieves on the order of log n steps in order to sort n records.

Figure 5:
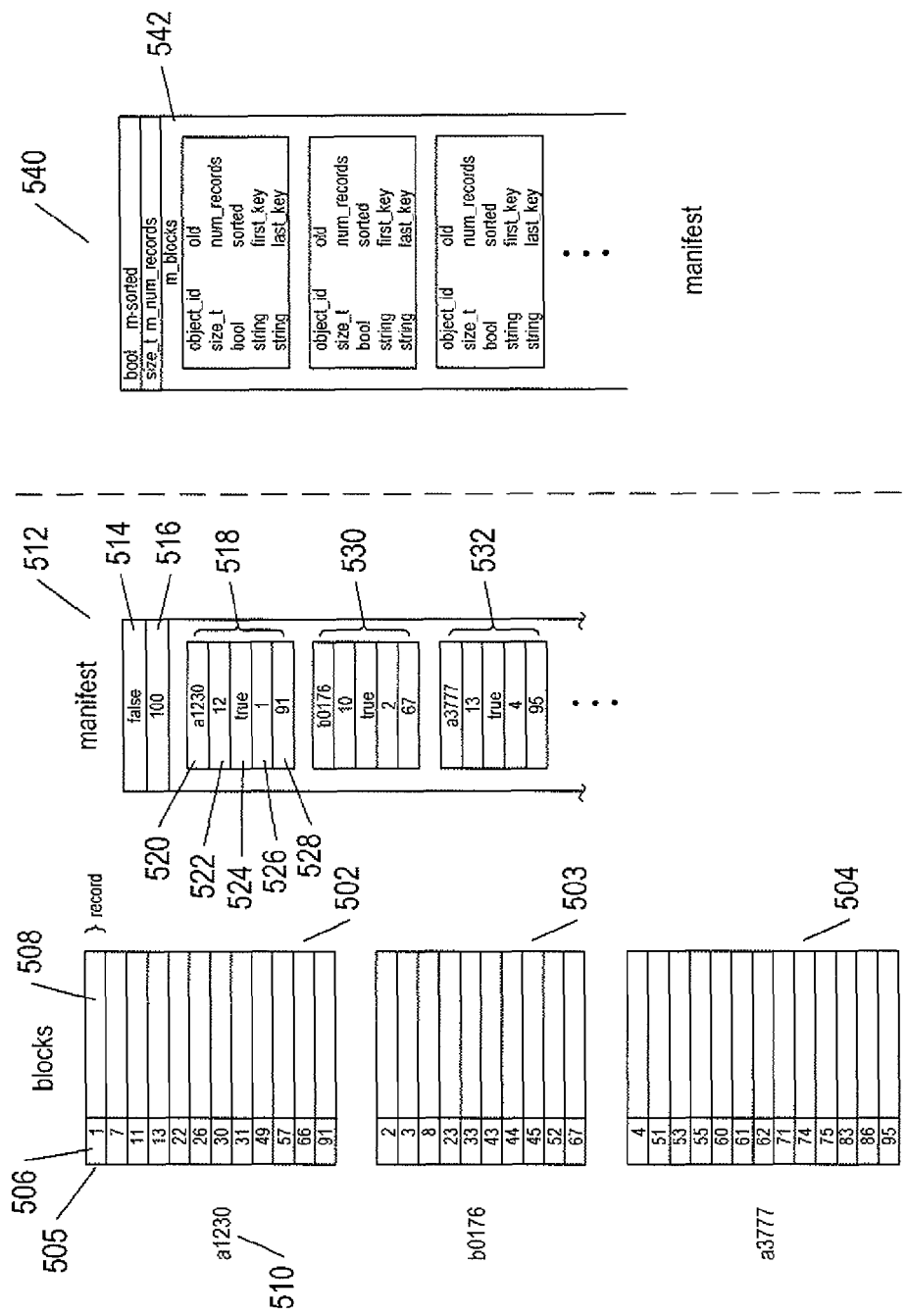
FIG. 5 illustrates a manifest object used in certain implementations of the currently disclosed methods and systems.

FIG. 5 illustrates a manifest object used in certain implementations of the currently disclosed methods and systems. The manifest is an object in the object-oriented-programming sense of the word "object." It can alternatively be thought of as a data structure. In FIG. 5, three different blocks 502-504 are shown in a left-hand column, each block including multiple records, such as record 505 in block 502, each record consisting of a numeric key and data, such as numeric key 506 and data 508 within record 505 of block 502. Each block is associated with an object identifier, including object identifier or block identifier 510 for block 502. A manifest object 512 represents a data set or data subset comprising one or more blocks of records. The manifest object includes a field indicating whether or not the records in the blocks associated with the manifest are sorted 514, the total number of records within all of the blocks associated with the manifest 516, and block-info objects within a vector of block_info objects that each characterizes a different one of the blocks associated with the manifest. For example, block_info object 518 describes block 502. Block_info object 518 includes the identifier for the block 520, an indication of the number of records in the block 522, a Boolean value indicating whether or not the records in the block are sorted 524, the first key of the first record in the block 526, and the final key of the final record in the block 528. Similar block_info objects or structures 530 and 532 describe blocks 503 and 504 in the same fashion. The manifest object is alternatively illustrated on the right-hand side of FIG. 5 540 using C++ definitions of the manifest members. The block_info objects or structures are contained within a vector named "m_blocks" 542.

Figure 6A:
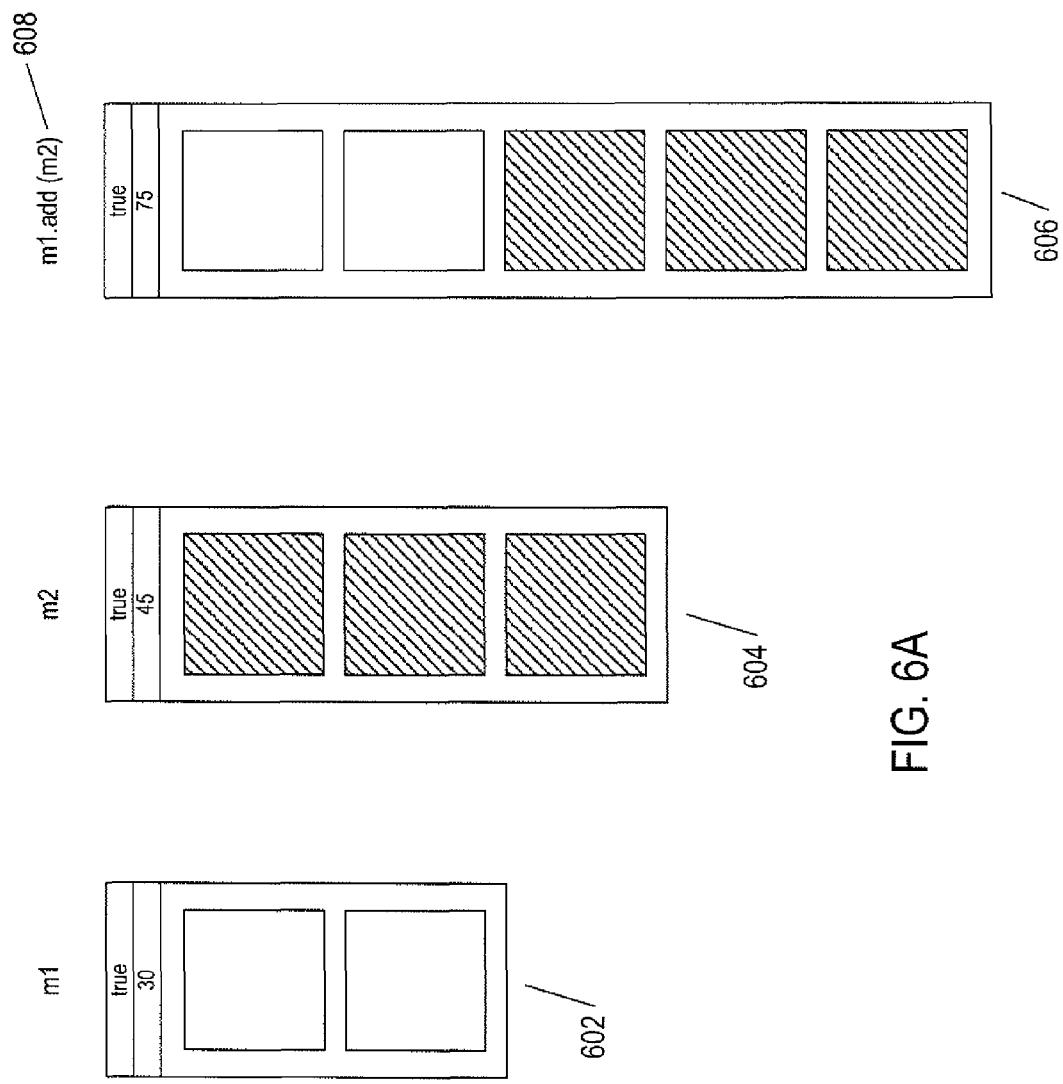
FIGS. 6A-B illustrate two different member functions associated with instances of the manifest class, or manifest objects, discussed above with reference to FIG. 5.
Figure 6B:
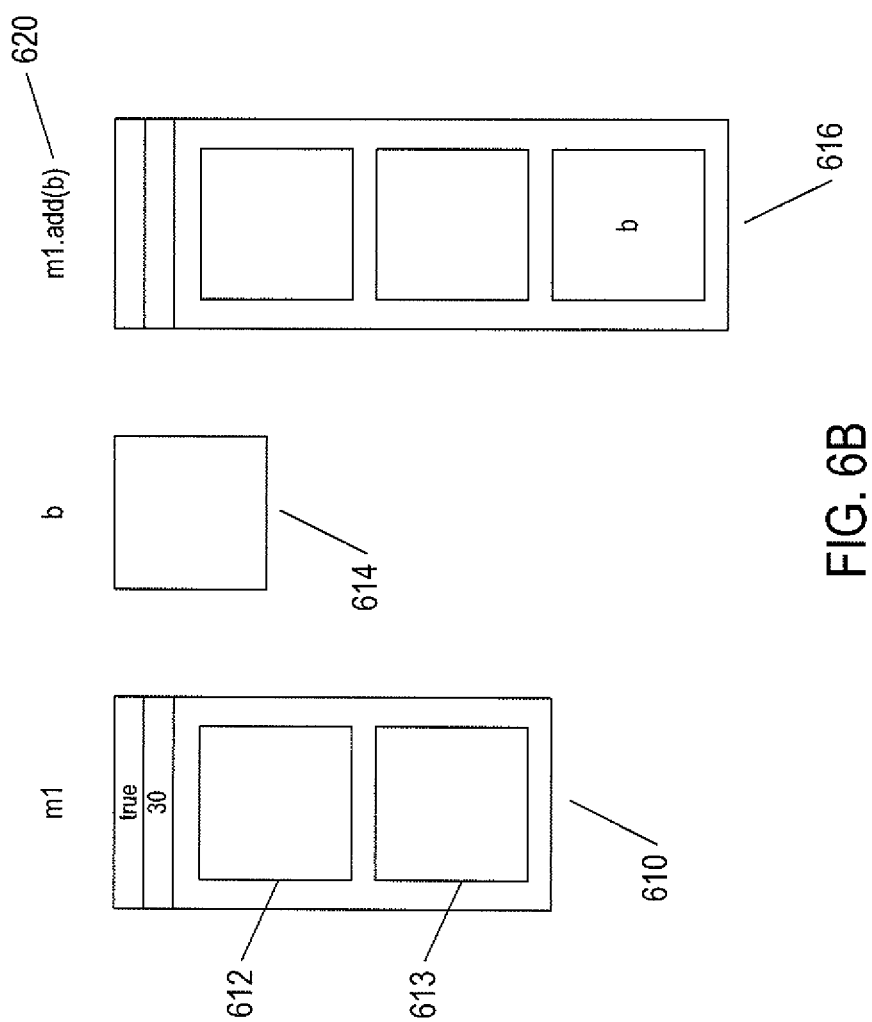

FIGS. 6A-B illustrate two different member functions associated with instances of the manifest class, or manifest objects, discussed above with reference to FIG. 5. The first member function, add, adds the blocks of a manifest m2 to a manifest m1 with respect to which the member function add is called. As shown in FIG. 6A, the manifest m1 602 contains two blocks that contain 30 records and the manifest m2 604 contains three blocks that contain 45 records. The add operation appends the blocks of manifest m2 to manifest m1 to create a larger manifest nil 606. The C++ syntax for invocation of the add member function is shown above the result block 608. FIG. 6B shows a different add member function of the manifest class that is invoked with respect to a particular manifest and that adds a block to a manifest. Manifest m1 610 in FIG. 6B initially includes two blocks 612-613. An additional block 614 is added to manifest m1 to produce a three-block manifest m1 616 via a call to the second add member function, the syntax of which 620 is shown above the result manifest.

Figure 7:
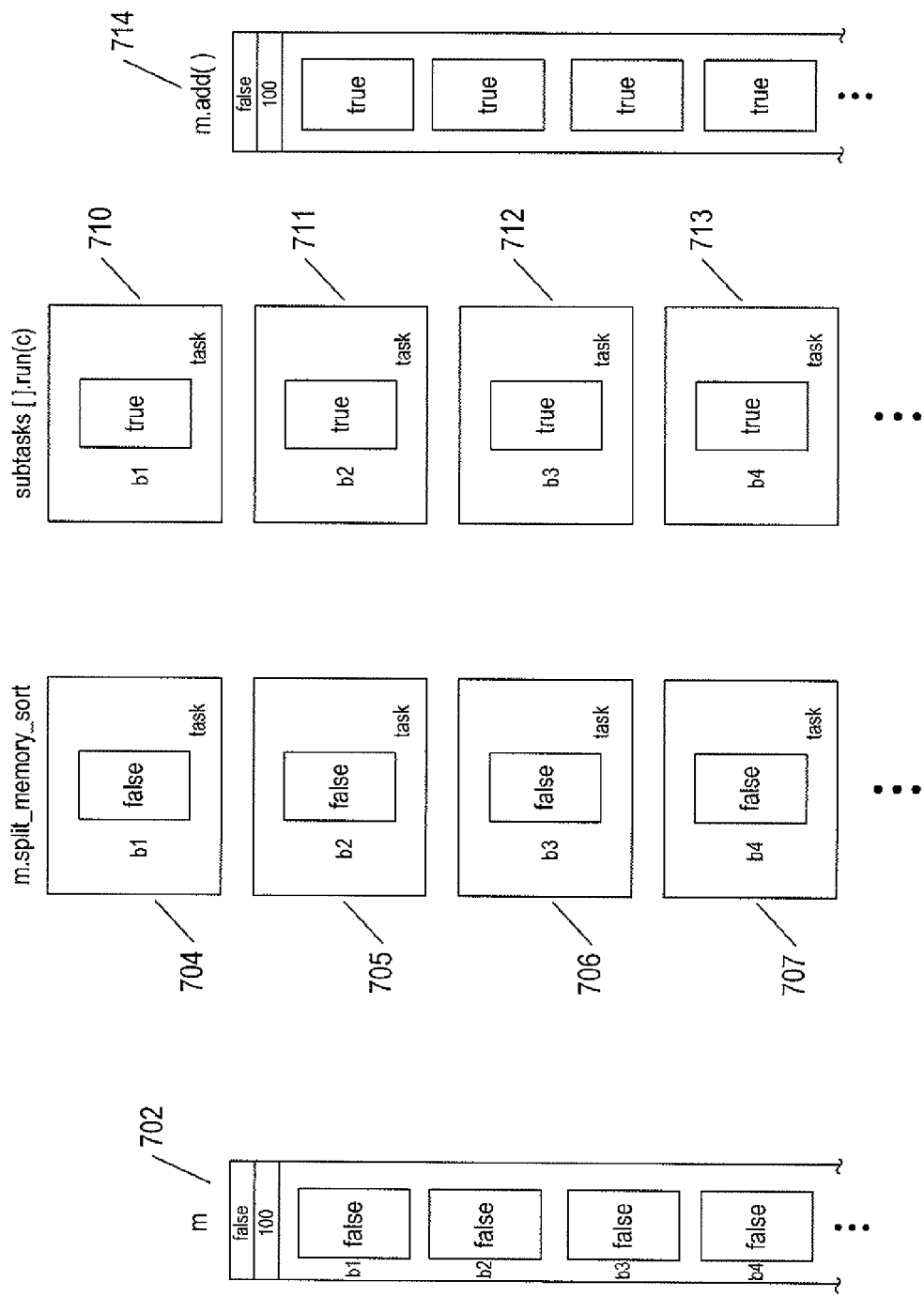
FIG. 7 illustrates a third member function of the manifest class.

FIG. 7 illustrates a third member function of the manifest class. The split_memory_sort member function associated with the manifest class partitions the blocks within a manifest 702 into a set of in-memory sort tasks 704-707 which are distributed among computational resources of a cloud-computing environment for execution. Following execution of these tasks, the blocks associated with each task are sorted, as shown in the column of completed tasks 710-713. The blocks associated with the completed tasks are, in the currently disclosed implementations of a cloud merge sort, reassembled back into a single manifest 714. Thus, the member function split_memory_sort creates a set of single-block, in-memory sort tasks, each task corresponding to a different block in the manifest, which are associated with tasks that are distributed for execution. After execution, the sorted blocks are reassembled into a single manifest object. Note that a manifest describes blocks that are stored within a data-storage subsystem of a computational environment. The blocks are not stored within the manifest object, but are referenced by the manifest object using data-object identifiers.

Figure 8A:
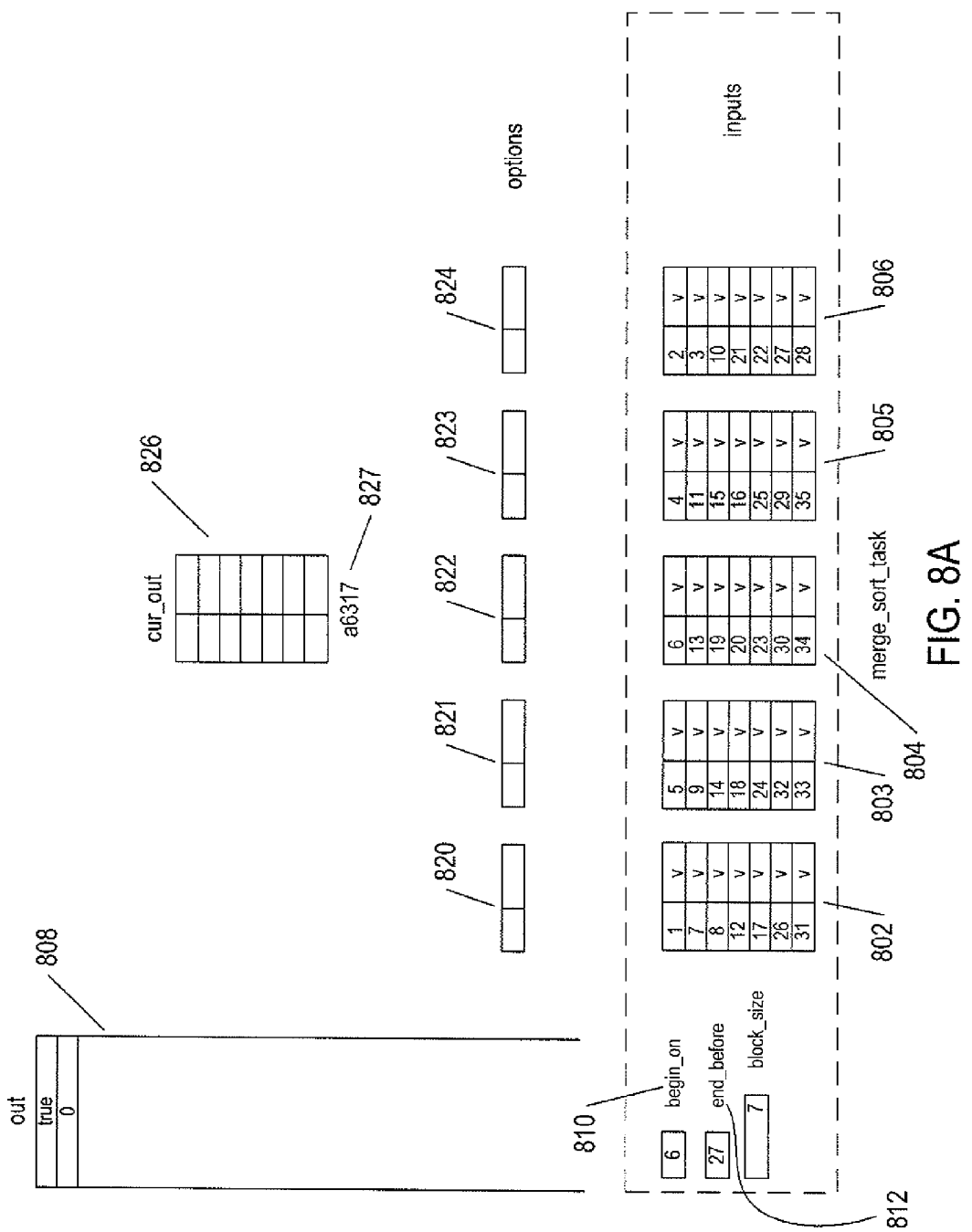
FIGS. 8A-K illustrate the carrying out of a merge-sort task on a data subset during one of the steps of the cloud merge sort (404 and 405 in FIG. 4).

FIGS. 8A-K illustrate the carrying out of a merge-sort task on a data subset during one of the steps of the cloud merge sort (404 and 405 in FIG. 4). FIGS. 8A-K all use the same illustration conventions, next described with reference to FIG. 8A. The merge-sort task sorts the records in an input set of blocks 802-806, storing the results in an output set of blocks represented by an output manifest 808. FIG. 8A shows the initial state of the merge-sort task, prior to sorting, with no output blocks associated with the output manifest 808. The merge-sort task includes additional data elements, including the value begin_on 810 which indicates the key value on which to begin a merge sort and the data member end_before 812 which indicates the final key value to include in the merge sort. Each of the input blocks 802-806 is associated with a corresponding options data structure 820-824, each, in turn, holding a single record read from the corresponding input block. An initial output block 826 with an associated block identifier 827 has been allocated for receiving records during the merge-sort-task execution.

Figure 8B:
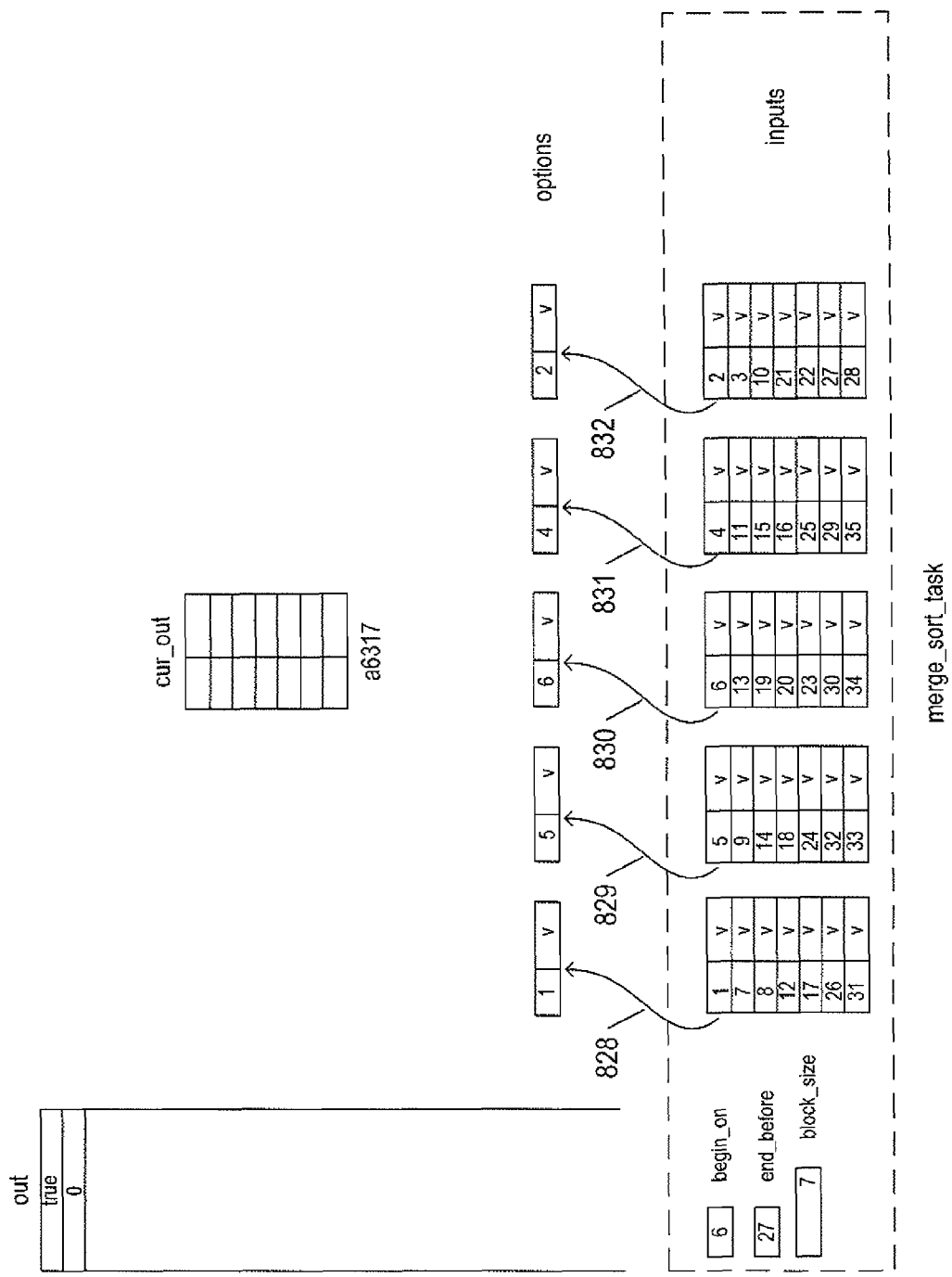
Figure 8C:
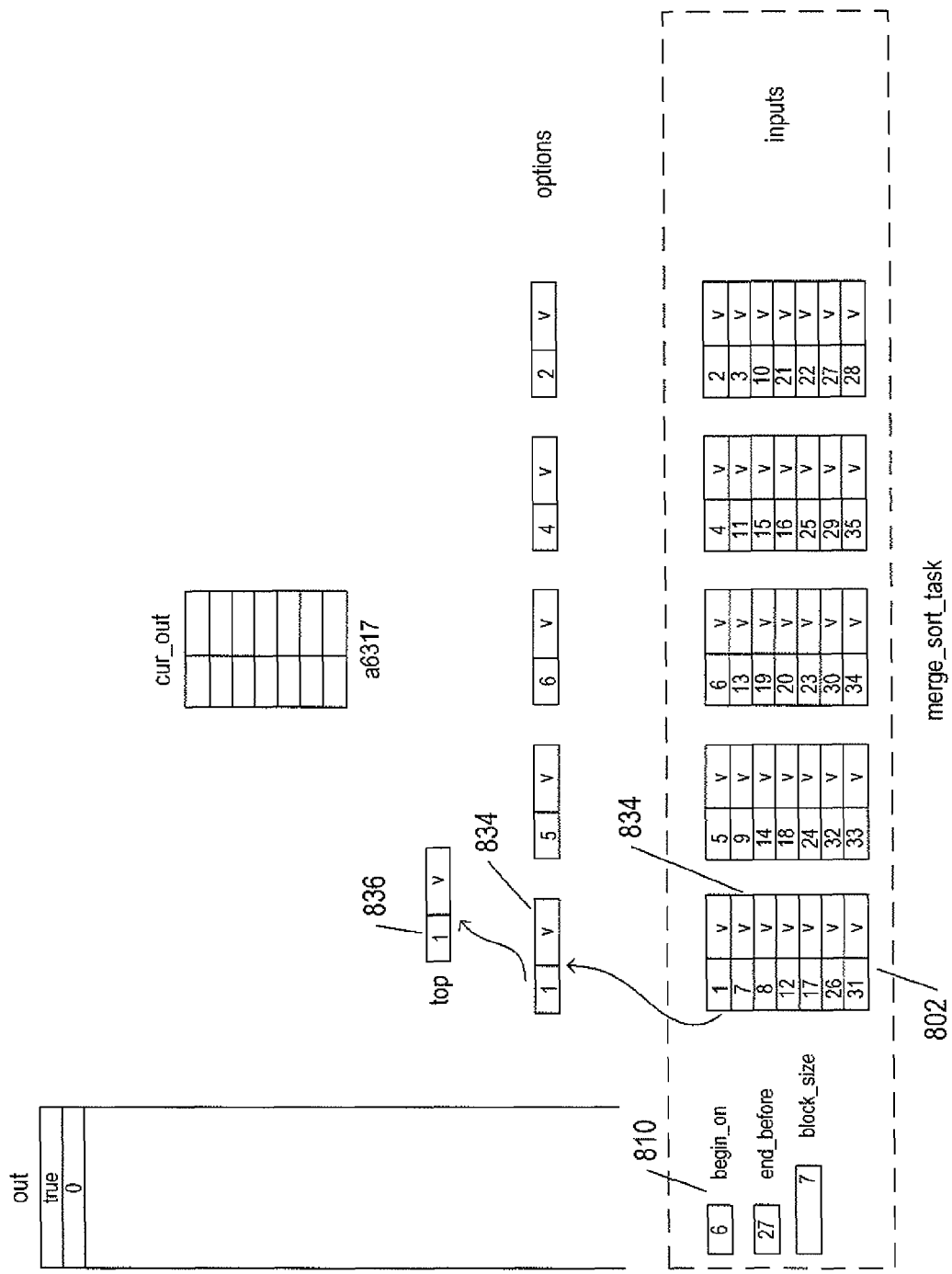

In a first step, shown in FIG. 8B, the first record from each of the input blocks is read into the corresponding options data structure, as indicated by arrows 828-832. Next, as shown in FIG. 8C, the records stored in one of the options data structures with the lowest key value, in this case the key value "1" stored in the options data structure 834, is moved to the top data structure 836, or, in alternative implementations, referenced by a pointer top, and the next-highest key value not yet moved to an options data structure is identified in the input blocks, in this case key value "7" in record 834 of block 802, and the record containing this key value is moved into the options data structure 834 from which the record was written to the top data structure 836. The key value in the record in the top data structure 836 is then compared with the value of the begin_on data member 810. Because the key value "1" in the records stored in the top data structure 836 is less than the value stored in the begin_on data member, "6," the record currently stored in the top data structure is discarded. In the alternative implementations, keys and values may be moved directly from the options data structures into the current output block, when the key values are within the merge-sort range of key values.

Figure 8D:
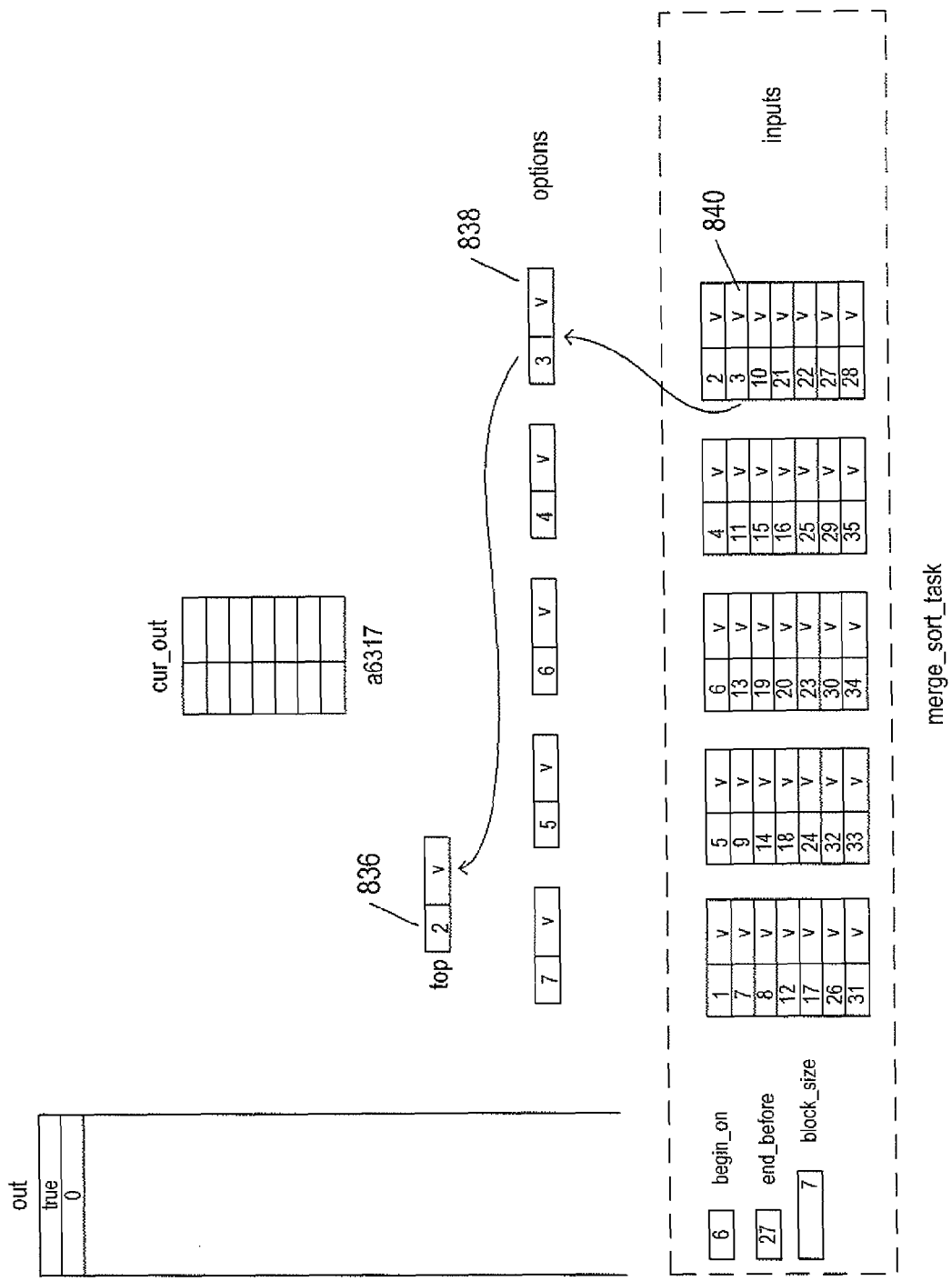
Figure 8E:
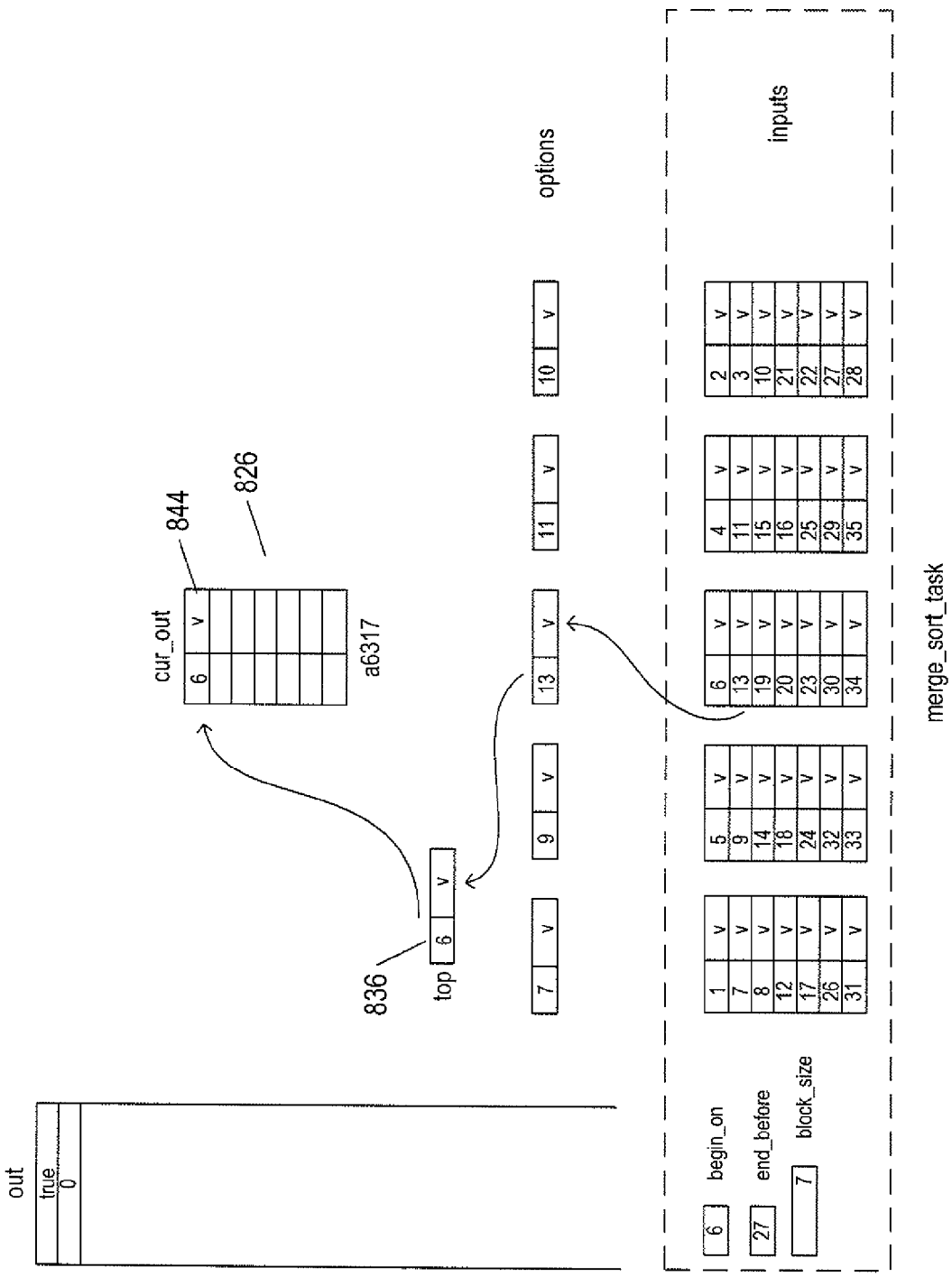
Figure 8F:
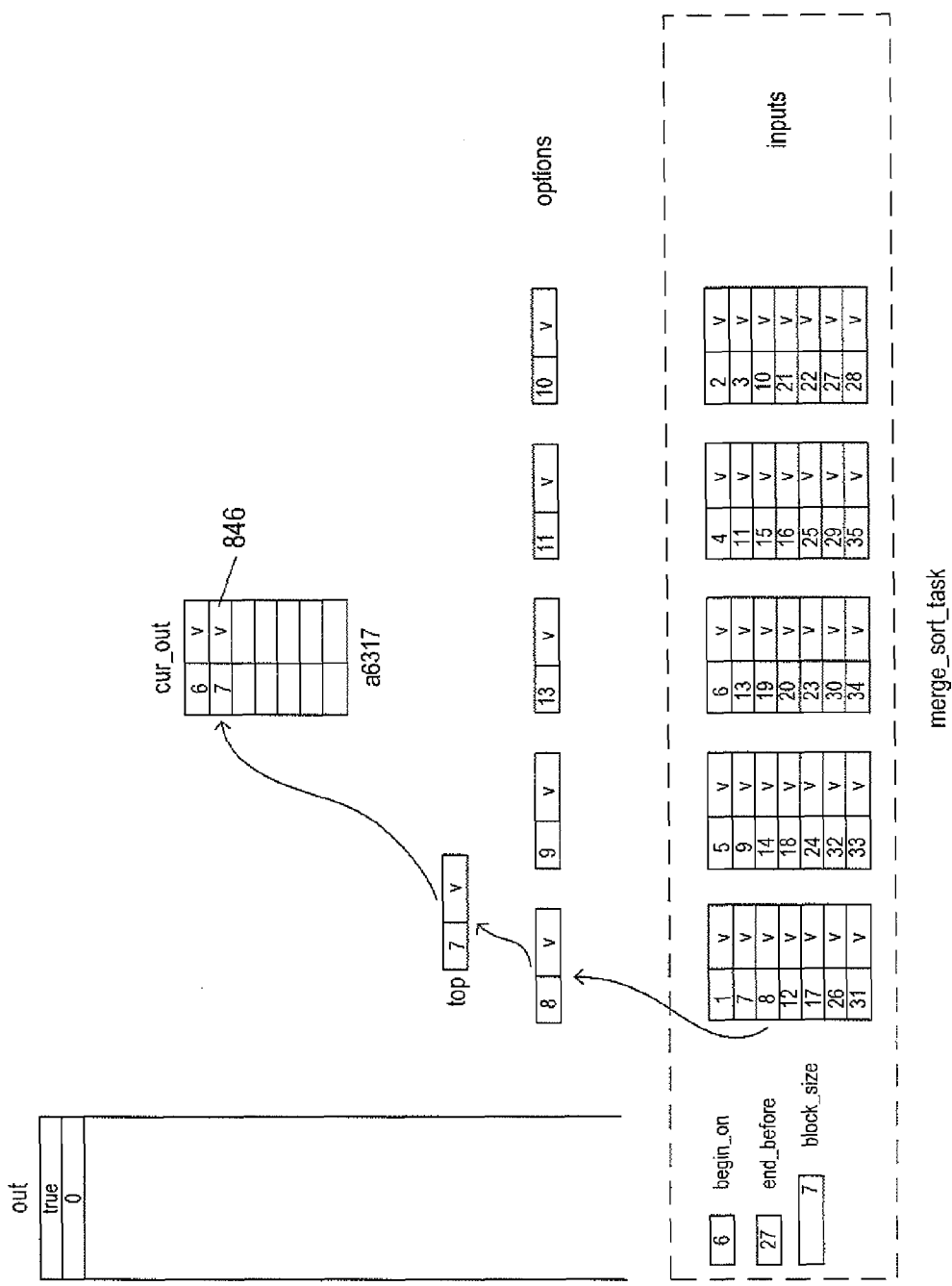
Figure 8G:
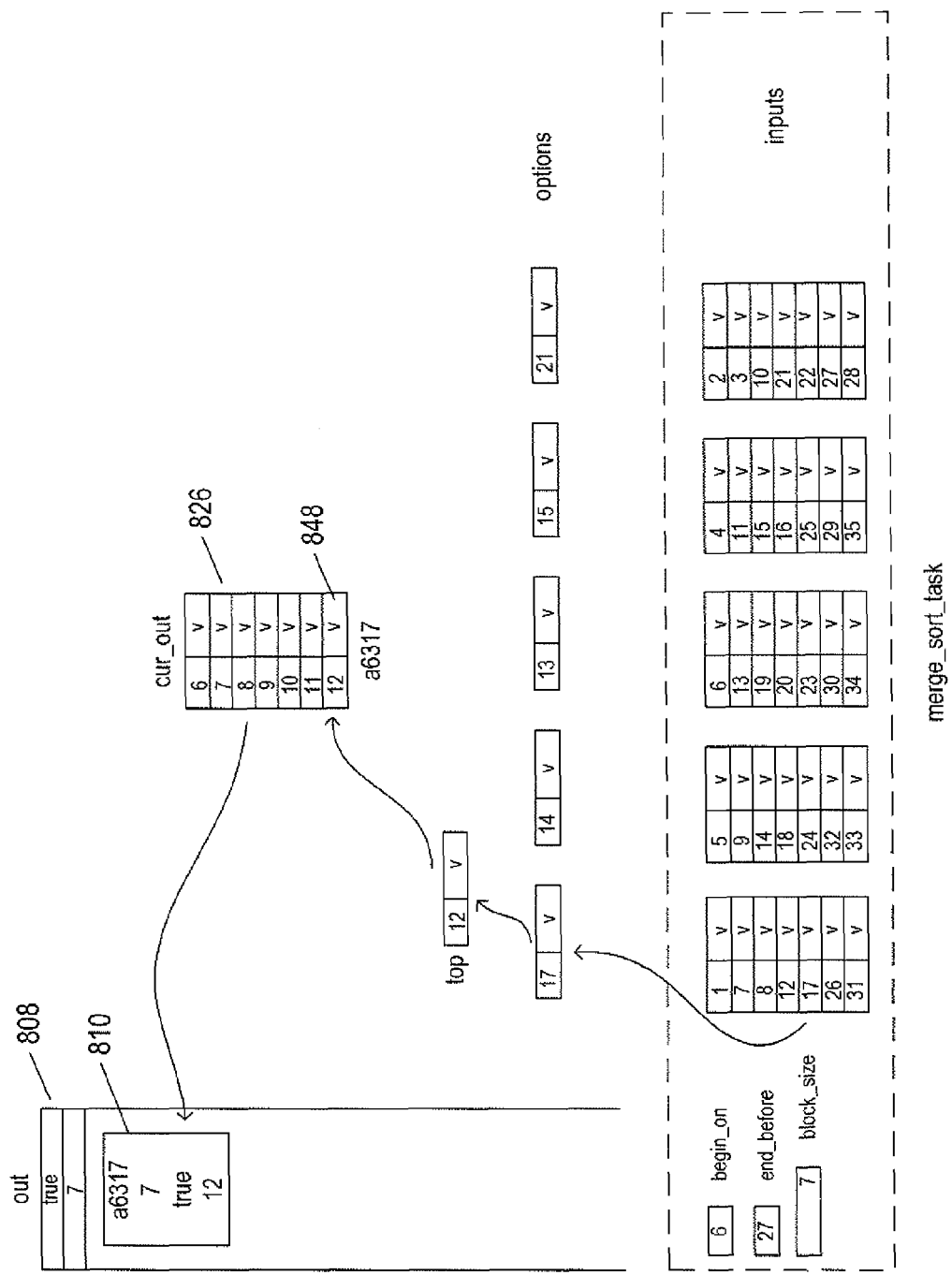
Figure 8H:
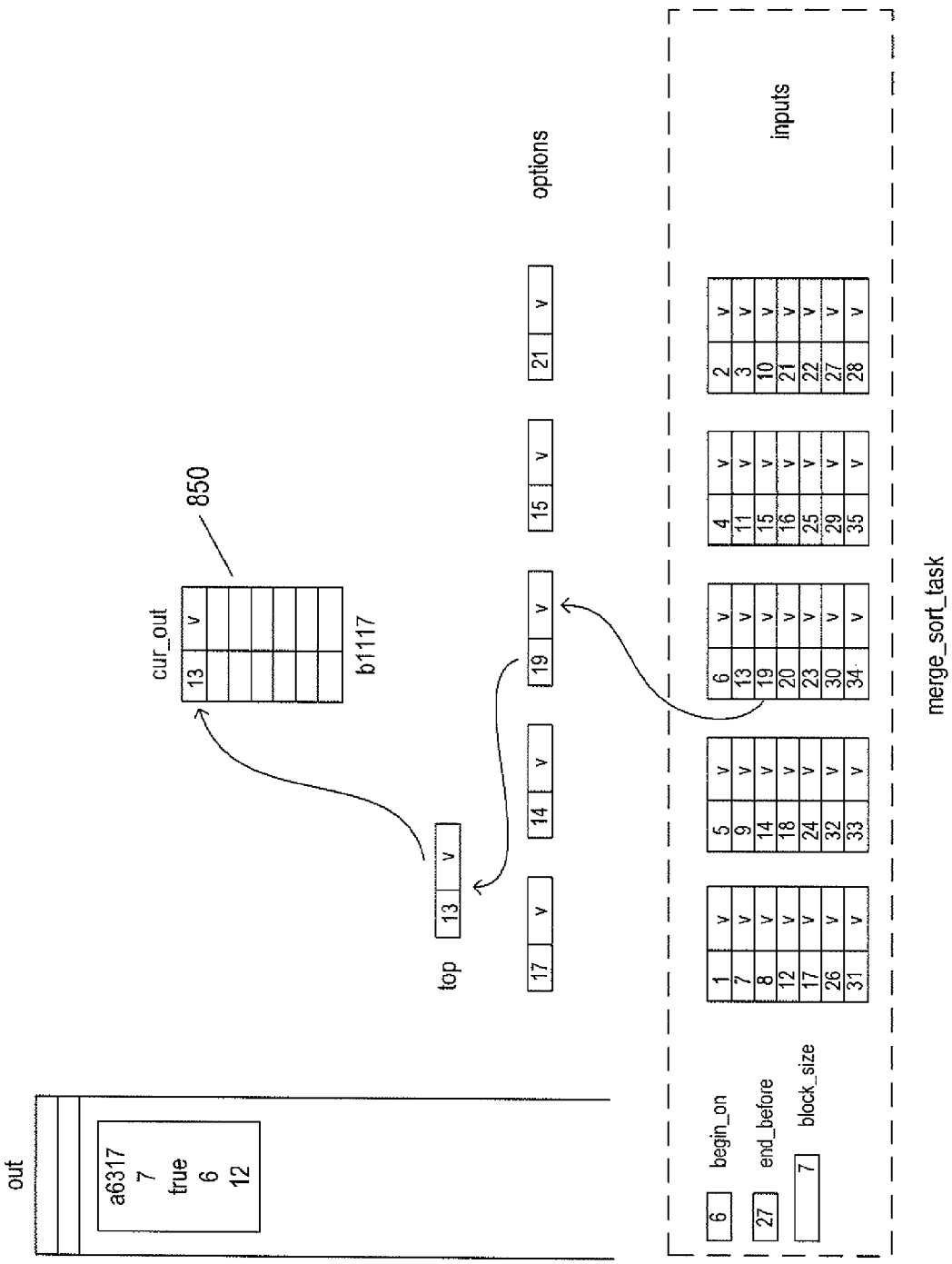
Figure 8I:
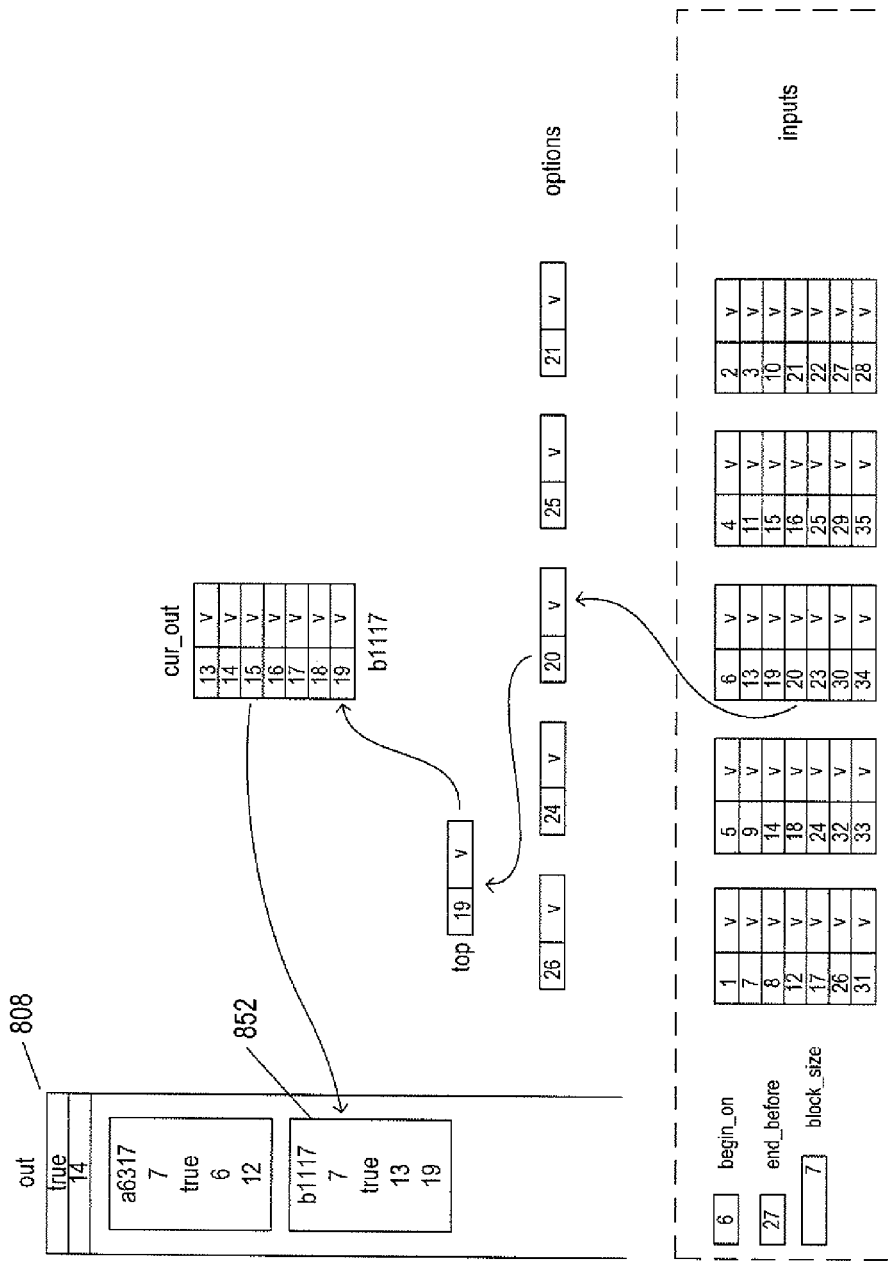
Figure 8J:
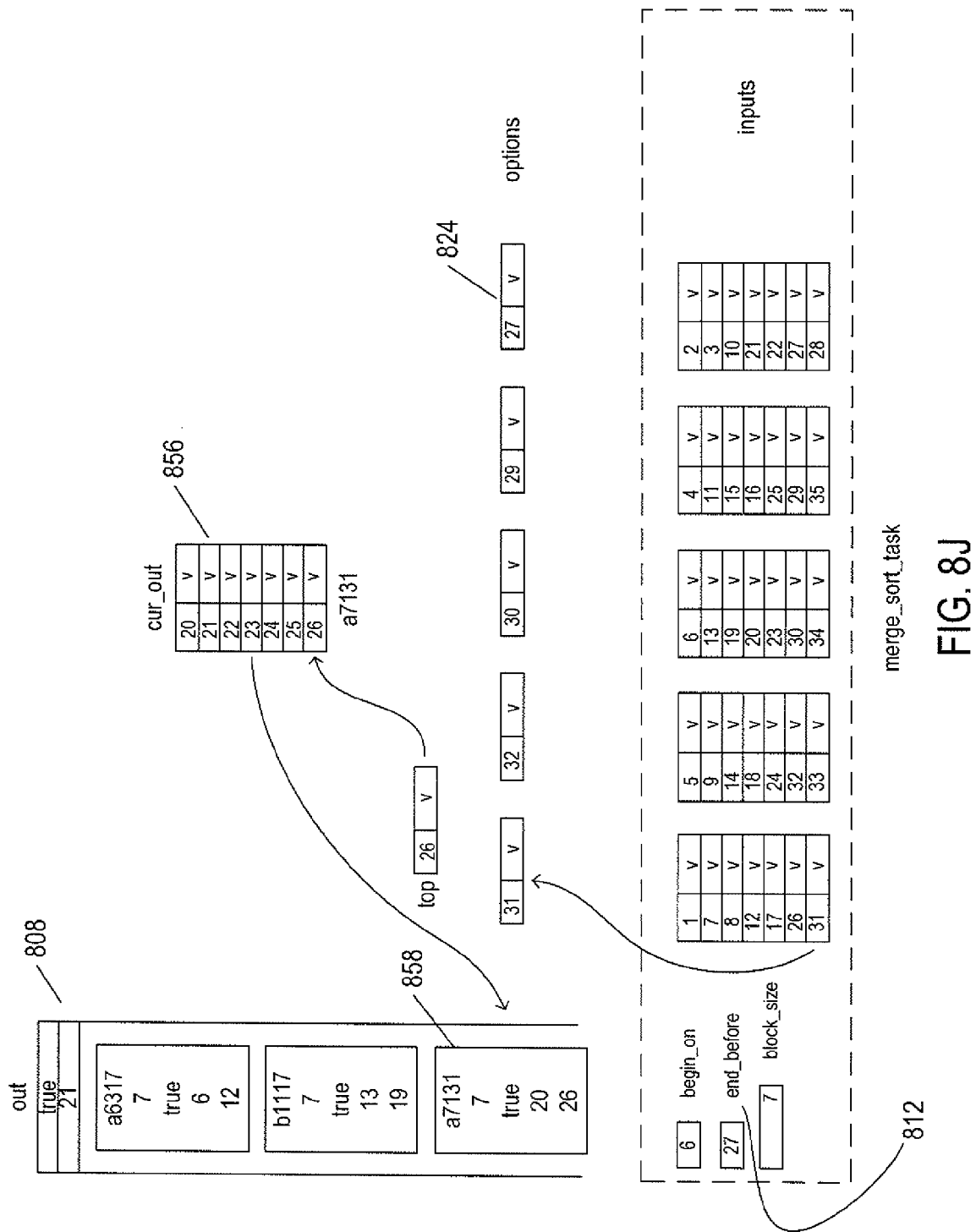
Figure 8K:
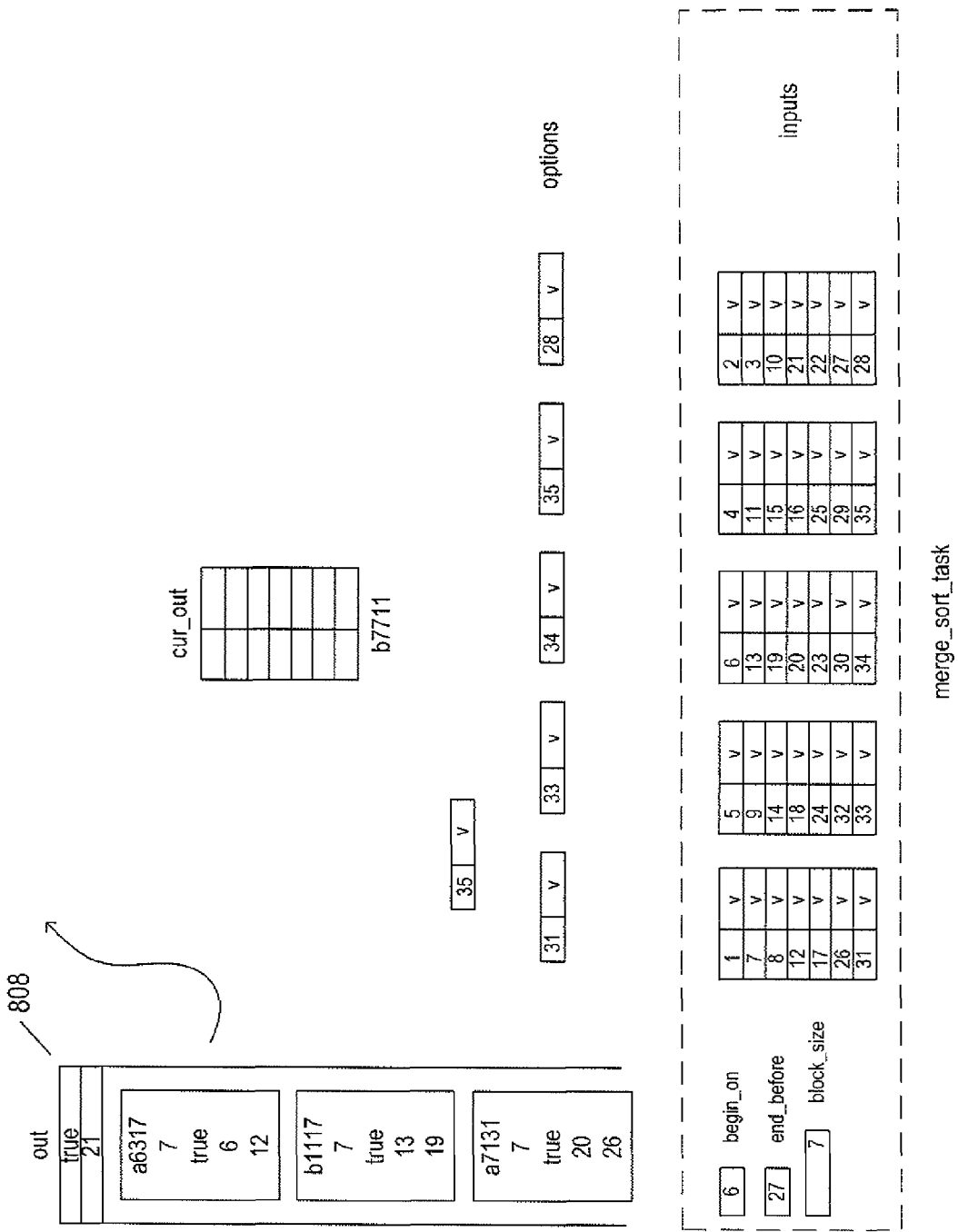

As shown in FIG. 8D, a next-highest key value is then found in one of the options data structures, in this case options data structure 838, and moved into the top data structure 836 and a record with a next-highest key value not yet stored in an options data structure is extracted from one of the input blocks, in this case record 840, and moved into the options data structure 838 from which the record was removed and written to the top data structure 836. Again, because key value "2" is less than the value stored in the begin_on data member, "6," the record stored in the top data structure is discarded. Similar steps continue until, as shown in FIG. 8E, the top data structure 836 contains a record with key value "6" equal to the value stored in the begin_on data member. In this case, this record is written from the top data structure into the current output block 826 as the first record 844 of the current output block. Again, in each record-moving operation, a next record is selected from an options data structure moved to the top data structure and a record with a next-highest key value is removed from one of the input blocks and used to replace the removed record in the options data structure from which the record was removed for writing to the top data structure. Now, however, records are moved from the top data structure into the current output block rather than be discarded, since the key values of the records are greater than the value stored in the begin_on data member. Thus, as shown in FIG. 8F, the record with the next-highest key value, "7," becomes the second record 846 in the initial output block. As the process continues, the current output block is eventually filled. As shown in FIG. 8G, once the last record 848 has been written to the current output block, the current output block is then associated with the output manifest 808 by including a block_info object 810 describing the output block within the output manifest. Note that the records within the output block 826 occur in ascending-key-value sorted order. As shown in FIG. 8H, following writing of the current block out to the data-storage subsystem and association of that block with the output manifest, a new current output block 850 is allocated and records continue to be read from the input data blocks via the options data structure and top data structure into the new current output block. As shown in FIG. 8I, when the second output block is filled, it is written to the data-storage subsystem and a block_info object 852 is written into the output manifest 808 in order to associate this next output block with the output manifest. As shown in FIG. 8J, the record-movement operations continue to the point that a third output block 856 has been filled and written to the data-storage subsystem, and a corresponding block_info object 858 has been written into the output manifest 808 to associated the third output block with the output manifest. At this point, the next-highest key value in one of the options data structures is the value "27" stored in options data structure 824. However, this value is equal to the value stored in the end_before data member 812. Therefore, all of the remaining records in the input blocks are discarded, since they have key values equal to or greater than the values stored in the end_before data member. Therefore, as shown in FIG. 8K, the merge sort is complete, with all output blocks stored in the data-storage subsystem and associated with the output manifest 808, which is returned as the result of the merge-sort task.

Figure 9A:
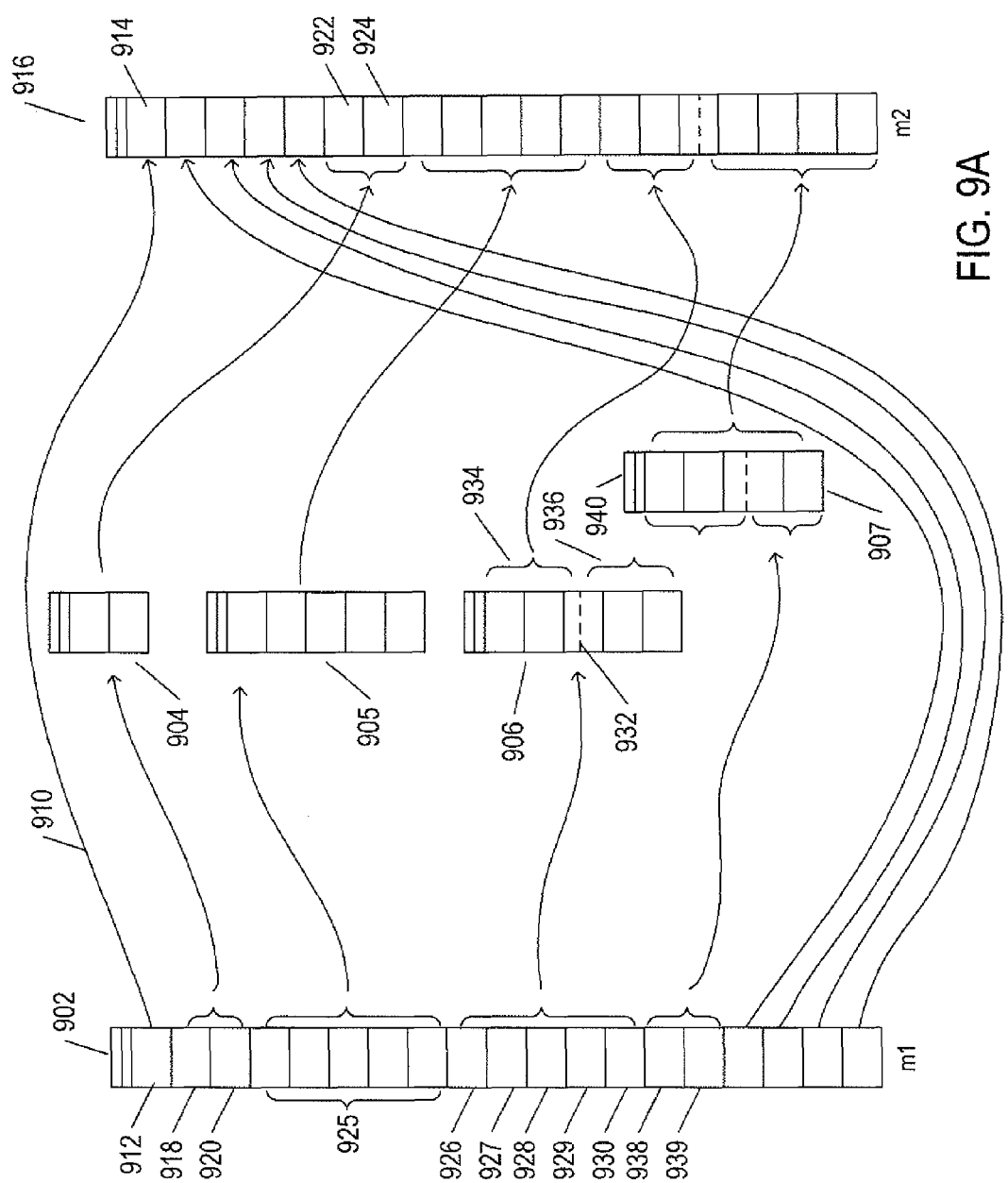
FIGS. 9A-D illustrate a final method associated with the manifest class that defines the manifest object.

FIGS. 9A-D illustrate a final method associated with the manifest class that defines the manifest object. This method, referred to as the split_merge_sort method, partitions a single manifest representing all of the data records into data subsets that are associated with tasks distributed among the computational resources of a cloud-computing facility. The data subsets are sorted by merge-sort operations, following which the data subsets are recombined into a single data subset represented by a single manifest object. FIG. 9A illustrates the split_merge_sort method associated with the manifest as well as subsequent execution of the distributed tasks. An initial manifest 902 is partitioned into data subsets, each represented by a manifest 904-907. In certain cases, such as the case represented by curved arrow 910, a single block 912 within the initial manifest 902 may be determined not to overlap any adjacent block and may therefore be directly entered 914 to a result manifest 916. Block overlap occurs when the range of key values of records within the block overlaps the range of key values in one or more neighboring blocks. In other cases, a number of adjacent blocks, such as blocks 918 and 920 in the original manifest, may overlap with one another but not overlap with any neighboring blocks. In this case, the set of adjacent blocks may be partitioned and assigned to a task 904 which merge sorts the blocks and associates them 922 and 924 with the result manifest 916. In certain cases, some maximum number of adjacent blocks, such as blocks 925, are deemed to be the maximum number of adjacent blocks that can be together assigned to a merge-sort task, despite the fact that one or more of them overlaps with blocks external to the maximum number of adjacent blocks. In certain cases, they may be associated with a merge-sort task 905, sorted, and then associated with the result manifest. In other cases, some maximum number of adjacent blocks, such as blocks 926-930, deemed to be the maximum number of adjacent blocks that can be together assigned to a merge-sort task despite the fact that one or more of them overlaps with blocks external to the maximum number of adjacent blocks, include only a few blocks that overlap neighboring external blocks. This type of overlap between the blocks of different data sets may result in unnecessary cloud-merge-sort iterations. As a result, in such cases, the data set is internally partitioned, as indicated by dashed line 932 within manifest 906 that represents blocks 926-930. A first portion 934 of the data subset is then assigned to a first merge-sort task, and a second portion 936 of the data subset is combined with a number of additional blocks 938-939 to form a second data subset represented by a second partition 940 which is then merge sorted and added to the result manifest. To summarize, blocks which do not overlap neighboring blocks may be passed directly to the result manifest, groups of mutually overlapping blocks that do not overlap blocks of other data subsets are generally merge sorted and the sorted-block results are added to the result manifest and, in certain cases, data subsets are internally partitioned, a first portion assigned to a first merge-sort task and a second portion combined with additional blocks and assigned to a second merge-sort task. The split_merge_sort method of the manifest class therefore carries out the fanning-out portion of each cycle (405 and 406 in FIG. 4), following the first in-memory, single-block sort step, of the cloud-merge-sort method discussed above with reference to FIG. 4.

Figure 9B:
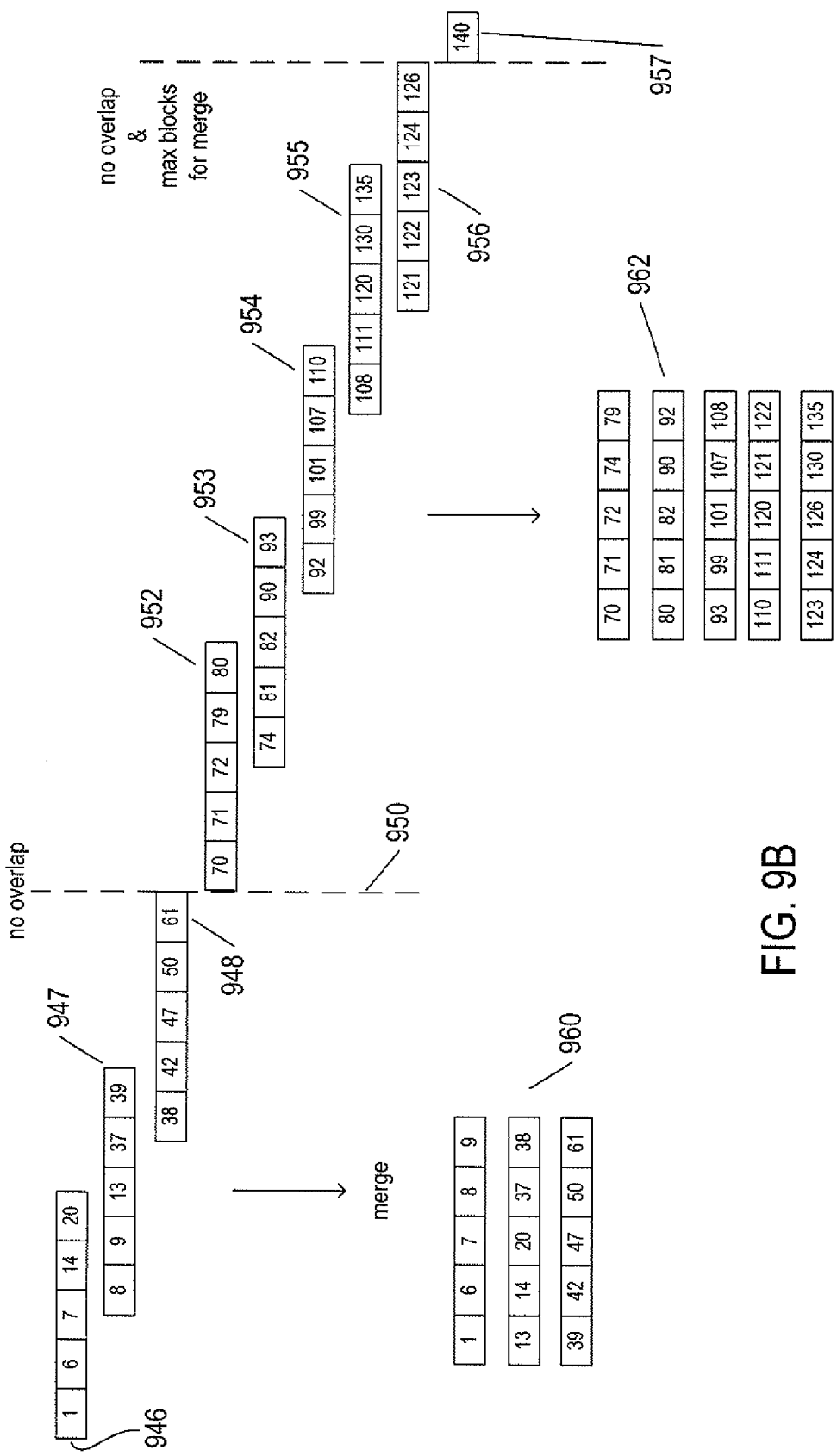
Figure 9C:
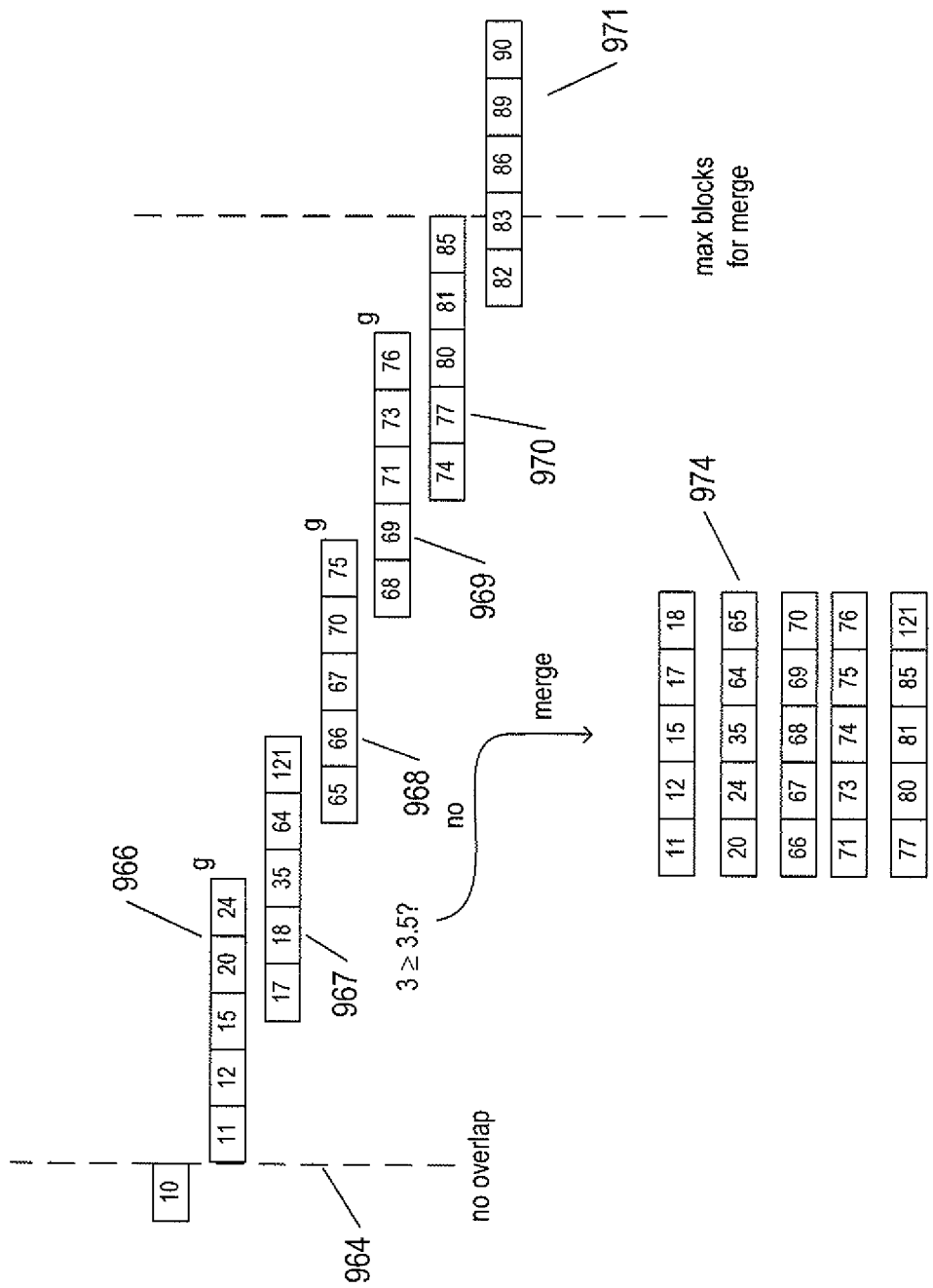
Figure 9D:
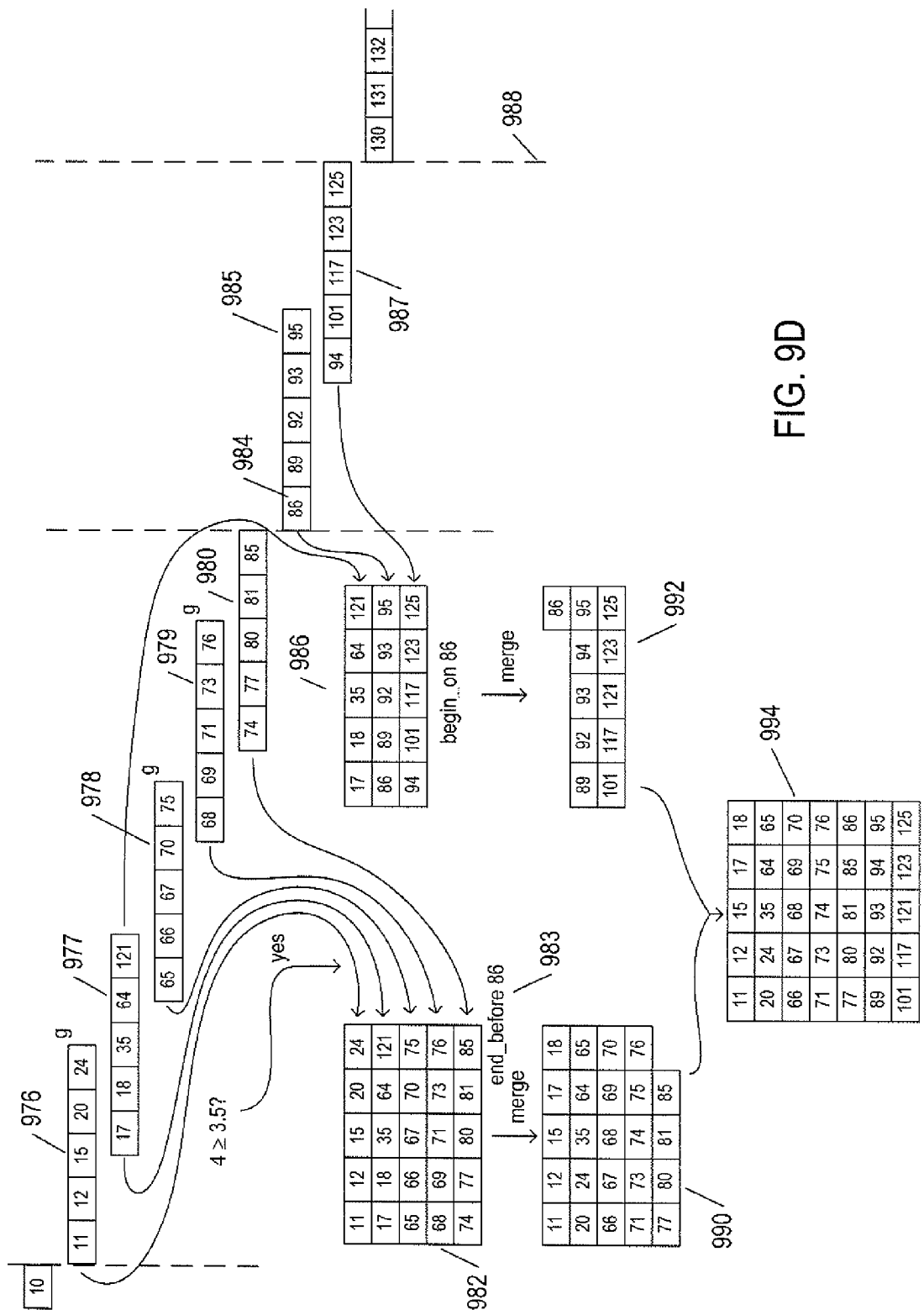

FIGS. 9B-D illustrate the various types of data partitions and subsequent merge-sort operations. In FIGS. 9B-D, blocks are represented as linear arrays of key values, such as the linear array of key values 946. In FIG. 9B, blocks 946-948 overlap with one another, as indicated by the alignment of the blocks shown in FIG. 9B and the first and last key values in each block. For example, block 947 includes a key value "8" that lies within the range of key values "1" to "20" in the preceding block 946. However, at the block boundary indicated by vertical dashed line 950, there is a clean separation between the three preceding blocks 946-948 and subsequent block 952. This is therefore an example of a set of mutually overlapping blocks that do not overlap adjacent data blocks and that can therefore be merged together in a merge-sort operation to produce three result blocks in which the key values are completely sorted 960. The set of blocks 952-956 also mutually overlap but do not overlap with adjacent block 957, only the first key value of which is shown in FIG. 9B, and are therefore included in a data subset and sort merged to produce five sorted result blocks 962.

FIG. 9C illustrates a set of data blocks that mutually overlap, but that also overlap with an adjacent block. In FIG. 9C, there is a clean boundary 964 between preceding blocks and blocks 966-970. However, block 970 overlaps with the following block 971. In the case that five blocks is considered to be the maximum allowed data subset, blocks 966-970 are initially grouped together as a data subset for a sort-merge operation. However, at this point, additional considerations need to be applied to this data set to determine how it will be processed. First, those blocks that do not overlap with the following block 971 are counted, with these counted non-overlapping blocks labeled with a small symbol "g." In this case, blocks 966, 968, and 969 do not overlap with the subsequent block 971 and are thus marked with the "g" symbol indicating that they are good. The remaining blocks 967 and 970 do overlap with the following block 971. When the number of good blocks is greater than or equal to a threshold value, in this case taken to be 0.7 times the maximum number of blocks that can be aggregated into a data subset, then the data subset can be assigned to a single task for the merge-sort operation to produce a sorted data subset of result blocks 974. Note that this result set of blocks does, in fact, overlap the following block 971. FIG. 9D shows an example in which a data subset is subsequently partitioned, with the partitions assigned to two different merge-sort tasks. In FIG. 9D, blocks 976-980 are initially assigned to a data subset. However, the number of good blocks, four, is greater than or equal to the threshold value 0.7 times the maximum number of blocks that can be aggregated into a data subset, as a result of which this data subset needs to be internally partitioned. All of the blocks are assigned to a first partition 982, but that partition is associated with an end_before value of "86" 983, which is the smallest key value 984 in the following block 985. Then, all of the blocks of the data subset that overlap the following block, in this case only block 977, are placed into a second partition 986 which is then filled with subsequent blocks 985 and 987. Because there is a clean break 988 following block 987, the second partition 986 is completed at the clean break and contains three blocks. This partition is associated with a begin_on value "86," the lowest key value 984 in the block 985 that follows the data subset comprising blocks 976-980. A merge-sort operation, discussed above with references 8A-K, is carried out on each of the two partitions to produce two sets of sorted result blocks 990 and 992 which are then written to the data-storage subsystem of the cloud-computing environment and associated with the results manifest as a group of completely sorted blocks 994.

To recapitulate, as discussed above with reference to FIG. 4, the cloud merge sort is carried out in a number of steps, each involving partitioning of all of the data records to be sorted into data subsets which are then assigned to tasks distributed among computational resources for sorting. This partitioning and distribution is referred to as "fan out," and is illustrated in FIG. 4 by arrows, such as arrow 410, emanating from a block representing all of the data records, such as block 402, to a data subset, such as data subset 403. After execution of the tasks, the now-sorted data subsets are written back to the data storage subsystem of the cloud-computing facility and these sorted blocks are together represented again by a single manifest as a result data set, such as result data set 408. The first fan out is carried out by the split_memory_sort manifest-class method, in which each data subset contains a single block and all of the records within each of these blocks are sorted, in memory, within a computational resource of the cloud-computing facility before being written back to the data-storage subsystem and coalesced into a single manifest representation 408. In all subsequent steps, the fan-out operation is carried out by the split_merge_sort manifest-class method, in which the data subsets are generally relatively small numbers of blocks up to some maximum partition size. These partitions are then sorted by merge-sort operations after the associated tasks have been distributed among the computational resources of a cloud-computing environment, the resulting sorted blocks are written to the data-storage subsystem of the cloud-computing facility, and all of the data blocks and data records contained in the data blocks are again represented as a single data set by a single manifest. This process continues until no block overlaps another block, other than when identical key values occur at the complementary ends of adjacent blocks. At that point, all of the blocks can then be sorted by key value to generate a final manifest that represents the fully sorted data set.

Figure 10A:
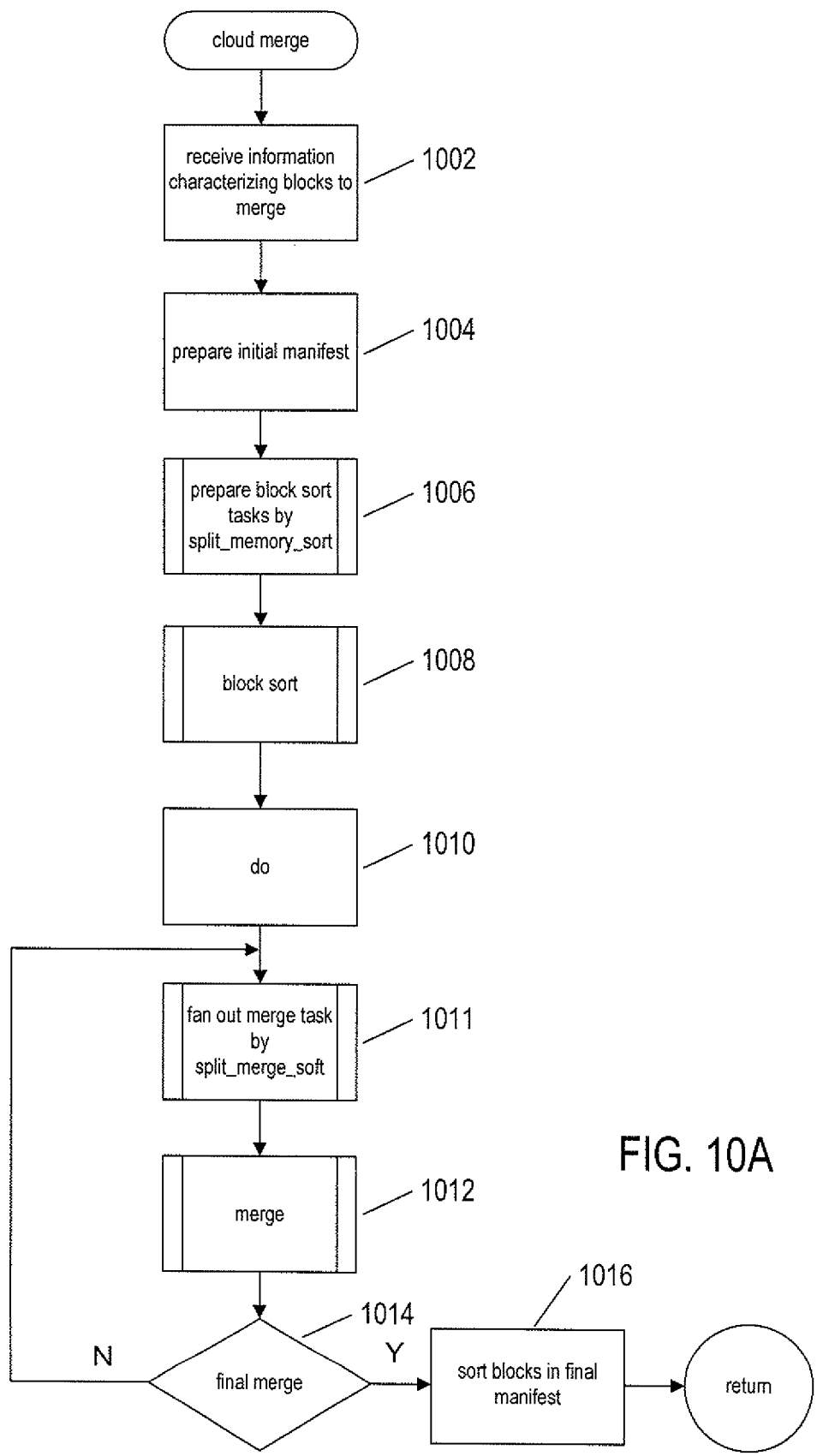
FIGS. 10A-F provide control-flow diagrams that represent one implementation of the cloud merge sort.

FIGS. 10A-F provide control-flow diagrams that represent one implementation of the cloud merge sort. FIG. 10A provides a control-flow diagram of the highest level of the cloud merge sort implementation illustrated in FIGS. 10A-F. In step 1002, the cloud merge sort receives information characterizing the blocks of records that are to be sorted within a cloud-computing facility. This information may be encoded within a manifest object, the sequence of block IDs encoded within one or more files, or in any of many other different ways of encoding an indication of a set of blocks stored within a cloud-computing facility. In certain cases, a cloud merge sort may instead receive the actual data records and then prepare a manifest as the data records are aggregated into blocks and stored into the cloud-computing facility. When the blocks to be sorted are not already encoded in a manifest, an initial manifest is prepared, in step 1004, to represent the entire data set. In step 1006, all of the records within each block are sorted by a fan out specified by the split_memory_sort manifest-class method, discussed above with reference to FIG. 7, and, in step 1008, the in-memory sort operation tasks are distributed among the computational resources of a cloud-computing facility for execution of the in-memory block sort of all of the blocks of the data set. Next, in a do-while loop of steps 1010-1014, each of a series of subsequent cloud-merge-sort cycles or steps are carried out until no blocks within a data set overlap, as determined in step 1014. Once no blocks overlap, then the blocks in a final manifest are sorted by initial key value, in step 1016, to produce a final manifest representing a fully sorted data set. In each iteration of the do-while loop of steps 1010-1014, the split_merge_sort method of the manifest class is used to fan out merged sort tasks, in step 1011, and then, in 1012, these tasks are distributed among the computational resources of the cloud-computing facility to carry out a merge sort on each data subset produced by partitioning the whole data set in step 1011.

Figure 10B:
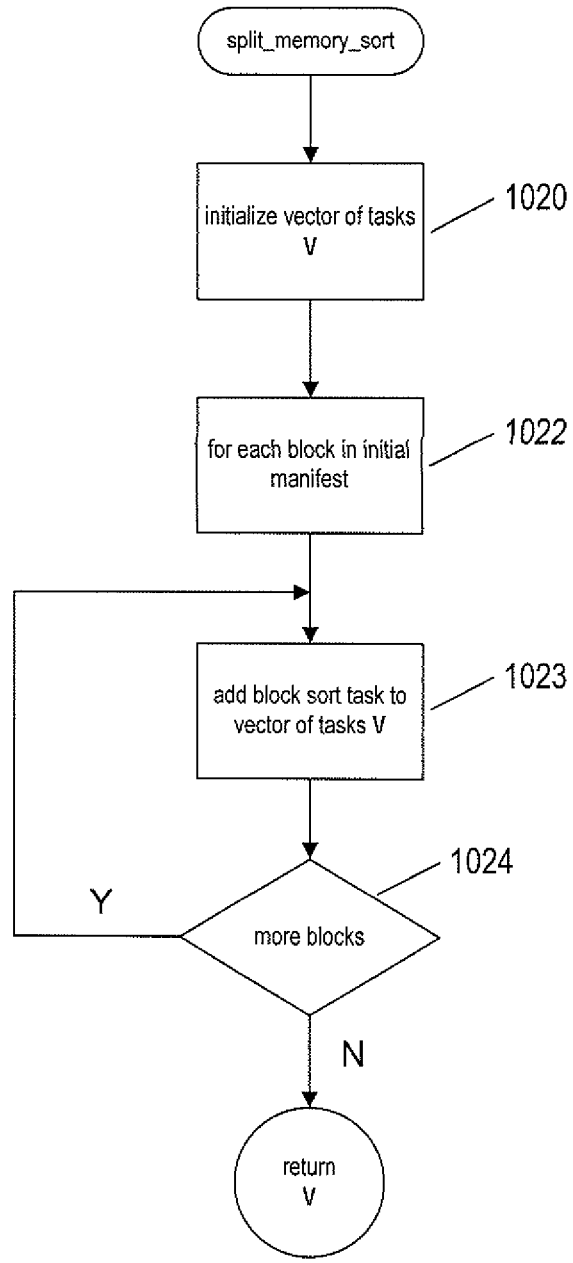

FIG. 10B illustrates the split_memory_sort method called in step 1006 of FIG. 10A. In step 1020, a vector of tasks V is initialized. Then, in the for-loop of steps 1022-1024, each block in the initial manifest is partitioned by creating a single-block manifest to represent the block, all of which are embodied in tasks that are entered into the vector of tasks V.

Figure 10C:
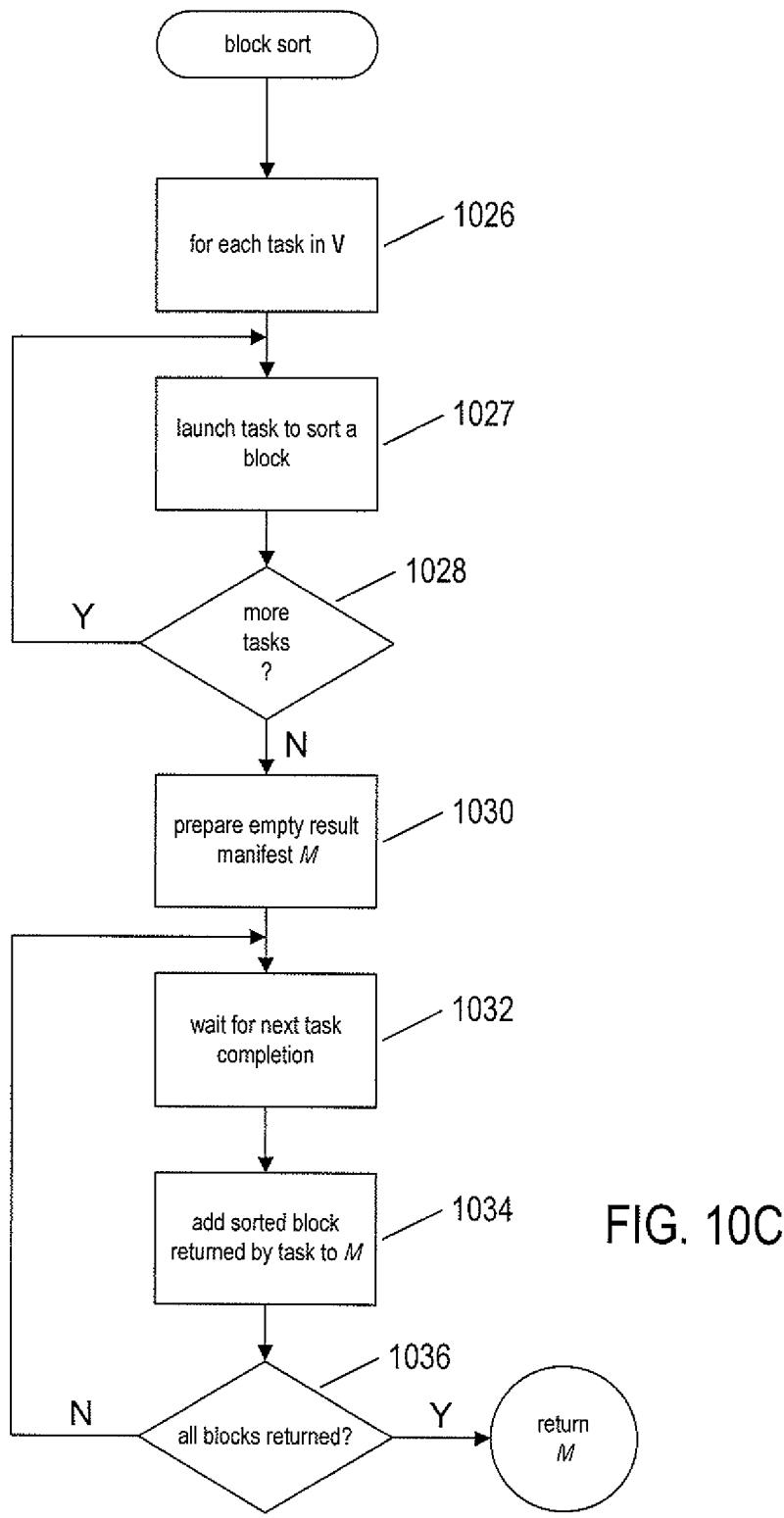

FIG. 10C illustrates the block-sort step 1008 in FIG. 10A. In the for-loop of steps 1026-1028, a task is launched within a computational resource of the cloud-computing facility for each task in the task vector V. In step 1030, an empty result manifest M is prepared and initialized. Then, the block-sort routine waits, in step 1032, for a next task to complete and, when a next task completes, adds the sorted block produced by the task to the result manifest M in step 1034. When all the blocks have been sorted, as determined in step 1036, then the block-sort routine returns. Otherwise, control flows back to step 1032 to wait for a next task completion.

Figure 10D:
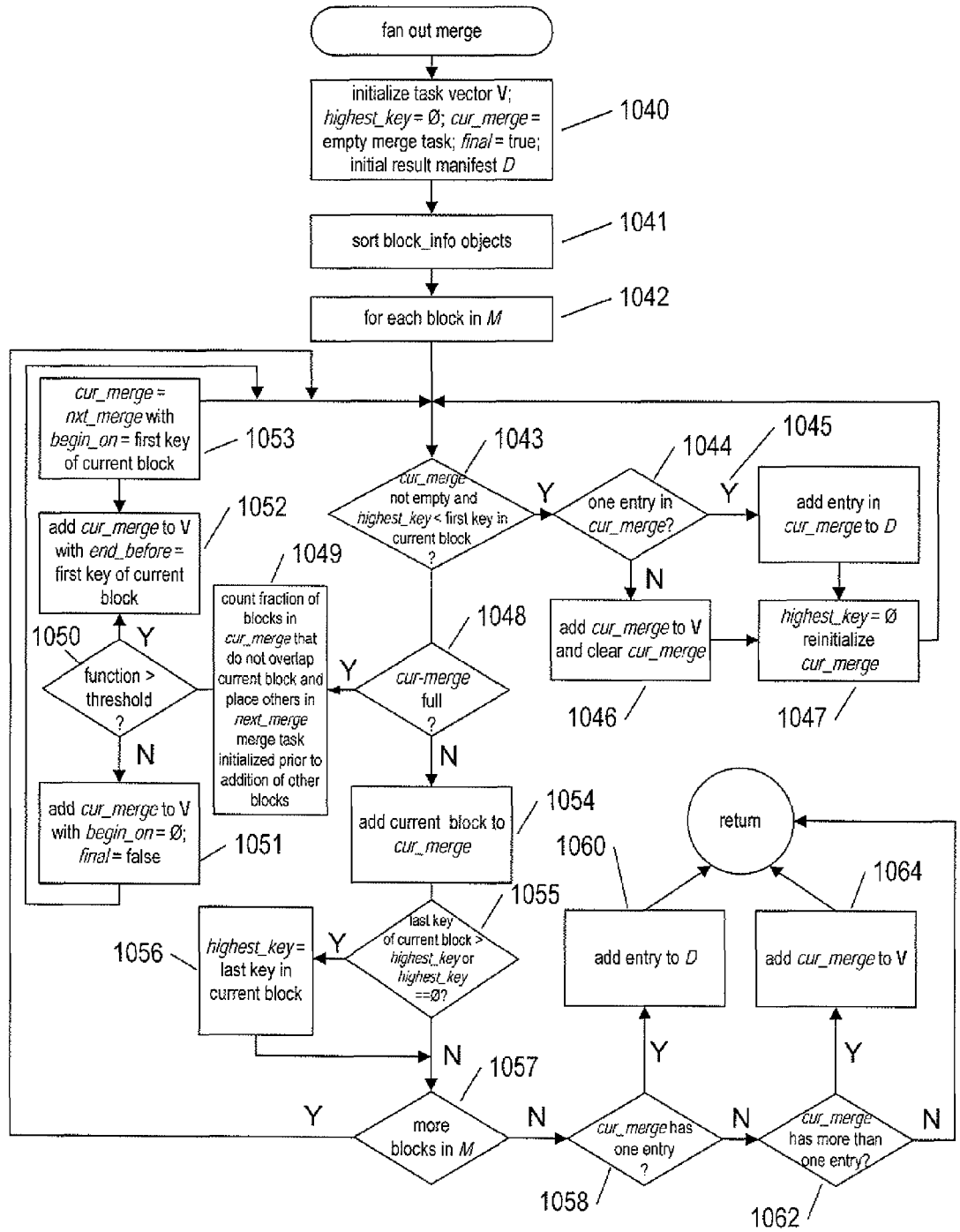

FIG. 10D illustrates the fan-out merge step 1011 in FIG. 10A. This corresponds to the split_merge_sort method of the manifest class. In step 1040, the fan-out-merge routine initializes an empty task vector V, sets a local variable highest_key to null, sets a local variable cur_merge to be an empty merge task object, sets the Boolean local variable final to true, and initializes a result manifest D. In step 1041, the block_info objects of the manifest are sorted primarily by first key value and secondarily by final key value. Next, in the for-loop of steps 1042-1057, the blocks in a manifest M is traversed, block by block. When the merge task cur_merge is not empty and the variable highest-key is less than the first key in the currently considered block of manifest M, then a clean break, such as clean break 950 in FIG. 9B, has been detected. When, as determined in step 1044, there is one entry in the merge task cur_merge, that entry is added to the result manifest D in step 1045. Otherwise the merge task cur_merge is added to the task vector V and cur_merge is cleared, in step 1046. Then, either after adding cur_merge to D or to V in step 1045 or 1046, the local variable highest_key is reset to null and the merge task cur_merge is reinitialized, in step 1047. When a clean break has not been detected in step 1043, then, in step 1048, the fan-out-merge routine determines whether the merge task cur_merge is full. If so, then, in step 1049, the fraction of blocks in the merge task cur_merge that do not overlap the currently considered block is determined and those blocks that do overlap the currently considered block are added to a new merge task next_merge. When the fraction of non-overlapping blocks exceeds some threshold value, as determined in step 1050, then there are only a few blocks in the merge task cur_merge that overlap the currently considered block. As a result, the merge task cur_merge is added to V with the value end_before set to the first key of the current block, as discussed above with reference to FIG. 9D. Then, in step 1053, the merge task cur_merge is set to next_merge with associated begin_on value equal to the first key of the current block, as also discussed above with reference to FIG. 9D. When the fraction of non-overlapping blocks is less than or equal to the threshold value, as determined in step 1050, then the merge task cur_merge is added to task vector V with the begin_on value to null. In addition, local variable final is set to false to indicate that overlapping blocks remain in the data set. When neither a clean break nor a full merge task are detected in steps 1043 and 1048, then the currently considered block is added to the merge task cur_merge, in step 1054. When the last key of the current block is greater than the value stored in the local variable highest_key or when the local variable highest_key has a null value, as determined in step 1055, then the local variable highest_key is set to the value of the last key in the current block in step 1056. Once the for-loop of steps 1042-1057 completes, then, when the merge task cur_merge is left with a single entry, as determined in step 1058, that entry is added to the result manifest D in step 1060. Otherwise, when the merge task cur_merge has more than one entry, as determined in step 1062, then the merge task cur_merge is added to the task vector V in step 1064.

Figure 10E:
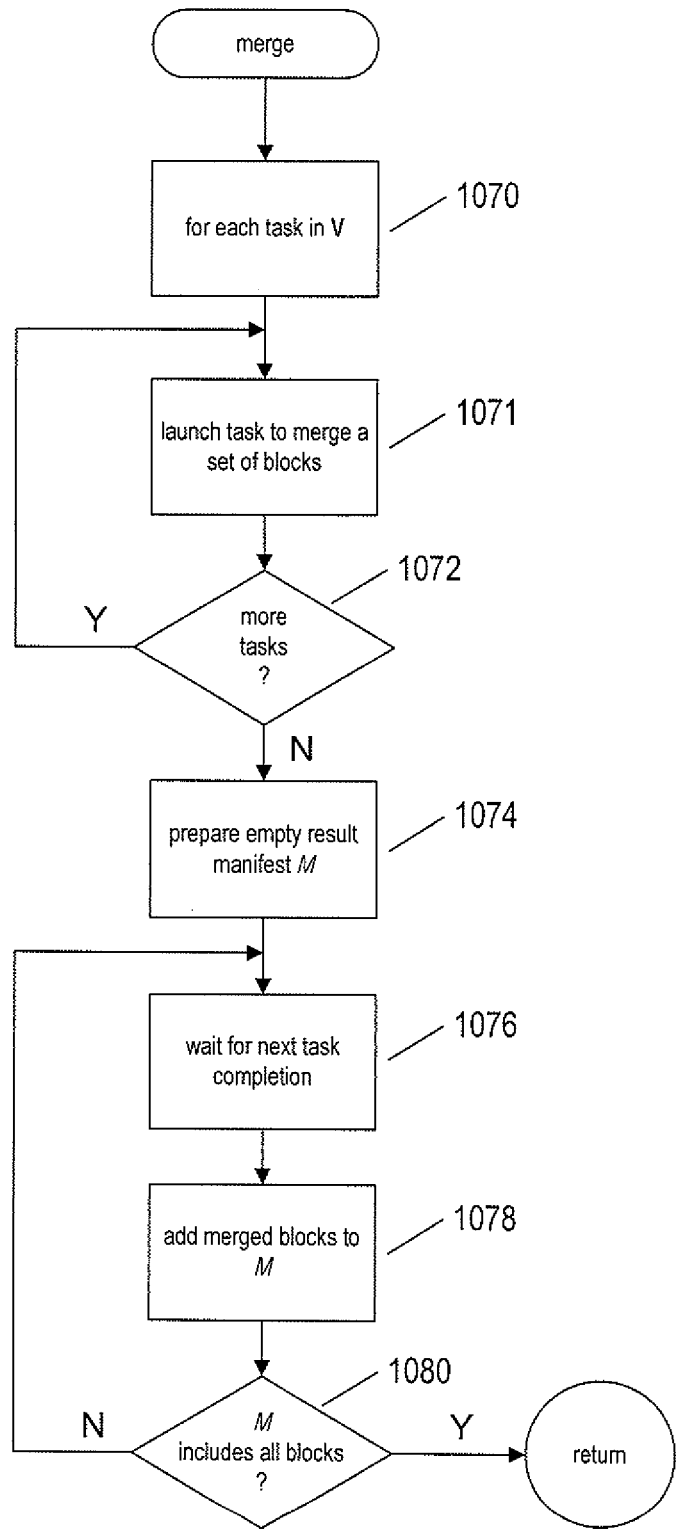

FIG. 10E illustrates the merge step 1012 of FIG. 10A. In the for-loop of steps 1070-1072, each of the tasks in the task vector V are launched on a computation resource within the cloud-computing environment. Then, in step 1074, an empty result manifest M is prepared. In step 1076, the merge routine waits for a next task completion. When a next task completes, the merged blocks produced by the task are added to manifest M in step 1078. When the result manifest M includes all of the blocks of the data set, as determined in step 1080, the routine merge returns.

Figure 10F:
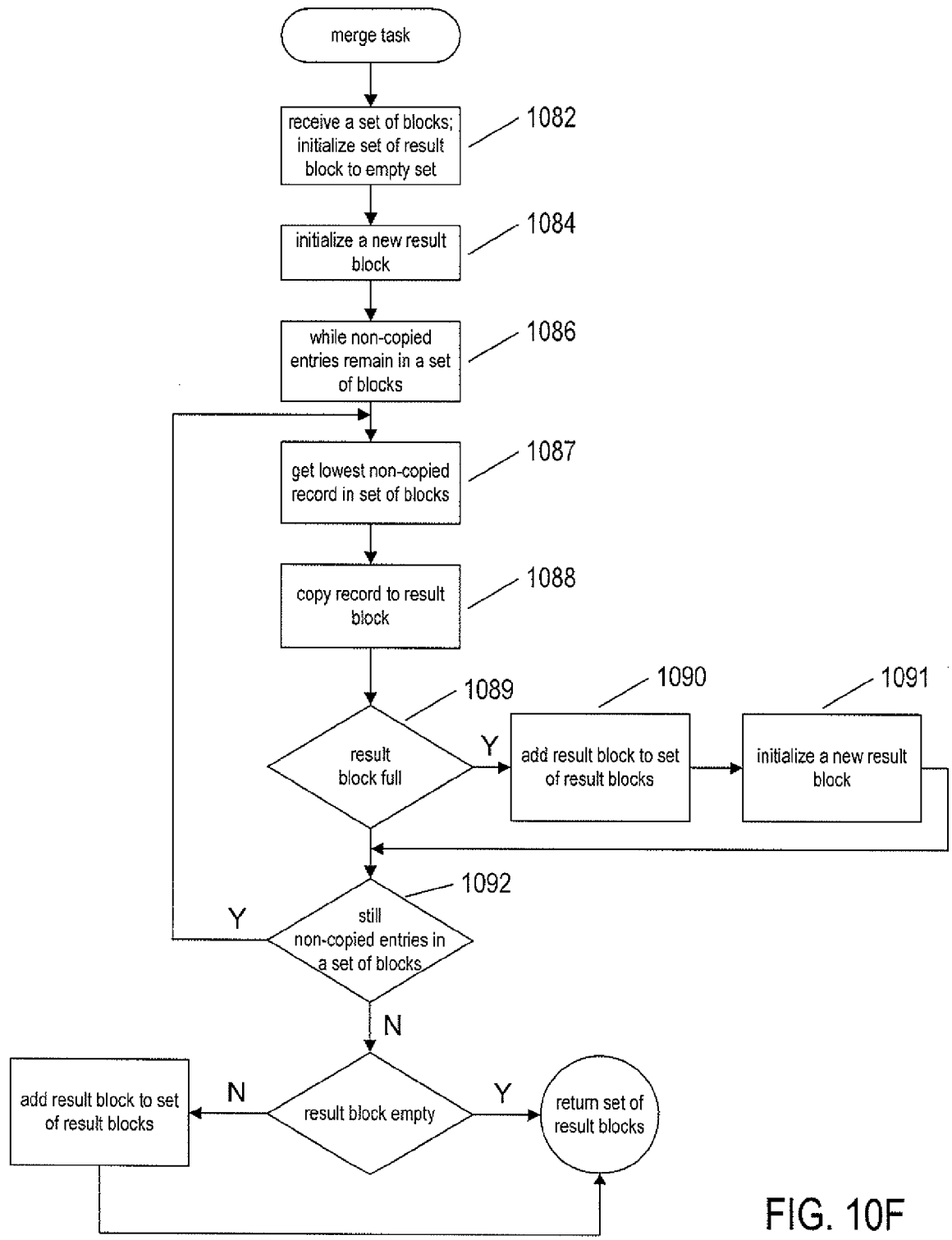

FIG. 10F provides a control-flow diagram of the merge task launched in step 1071 of FIG. 10E. The merge task is discussed above with reference to FIGS. 8A-K. In step 1082, the merge-task routine receives a set of blocks to merge sort and sets a results set of blocks to the empty set. In step 1084, a new result block is initialized. In the while-loop of steps 1086-1092, records are copied from the received blocks, in sort order, to the result block and, as result blocks are filled, they are added to the set of result blocks and a new result block is initialized, in step 1090-1091. At the termination of the loop, when there are records in the current result block, it is added to the set of result blocks. As discussed above with reference to FIGS. 8A-K, the merge task may consider the begin-on and end-before values in order to merge sort only a portion of the records in the received set of blocks.

The above-described cloud merge sort is designed to be reliable under cloud-computing conditions. For example, each of the distributed tasks generated in each fan-out operation of each cloud-merge-sort cycle is idempotent so that, whenever a task fails, it can simply be restarted on the same or another computational resource. Distribution of the tasks generated in each fan-out operation may be carried out according to any of many different types of task-distribution schemes. Each task may be distributed to a different virtual computer system within a cloud-computing environment, or sets of tasks may be distributed to each of a number of different virtual computer systems within a cloud-computing environment. Many other types of task-distribution schemes may be followed. As discussed above with reference to FIG. 4, it is desirable to maximize parallel execution of operations conducted on data subsets generated by each fan-out opera-tion. However, there is generally a balance point, or optimal point, with respect to the number of records distributed to each physical computational resource in each cycle. Distribution of too few resources would provide a smaller advancement of the sorting process than justified by the overhead incurred the distribution of tasks, while distribution of too many data records to each computational resource would fail to take advantage of the massive parallelism that can be advantageously employed in cloud-computing environments.

Next, a C++ implementation of the cloud merge sort is provided. This implementation employs a number of standard C++ libraries and data types, as can be seen in the following include and typedef statements:

```
#include <string>
#include <vector>
#include <map>
#include <stdexcept>
typedef std::string key_t;
typedef std::string value_t;
typedef std::string object_id;
typedef std::pair<key_t, value_t> kvp_t;
```

First, classes for the block_info objects that describe blocks within manifests and the class for manifest objects are declared, as follows:

```
 1  class block_info
 2  {
 3  public:
 4      block_info( ) : num_records(0) { }
 5          block_info(const object_id& _oid, size_t _num_records, bool _sorted,
 6              const key_t& _first_key = "", const value_t& _last_key = "")
 7              : oid(_oid), num_records(_num_records), sorted(_sorted),
 8              first_key(_first_key), last_key(_last_key) { }
 9      object_id oid;
10      size_t num_records;
11      bool sorted;
12      std::string first_key;
13      std::string last_key;
14  };
15  class manifest
16  {
17      friend class manifest_reader;
18  public:
19      manifest(bool sorted) : m_num_records(0), m_sorted(sorted) { }
20      void add(const manifest& other);
21      void add(const block_info& fi);
22      size_t get_num_records( ) const { return m_num_records;}
23      void split_memory_sort(std::vector<singlesort_task>& to_sort);
24      bool split_merge_sort(manifest& done, std::vector<mergesort_task>& to_sort, size_t
25          max_merge, size_t block_size);
26      void finalize_sort( );
27  private:
28      bool m_sorted;
29      size_t m_num_records;
30      std::vector<block_info> m_blocks;
31  };
```

The class block_info includes two constructors, declared on lines 4-8, and data members, on lines 9-13, that store the identifier for a block, number of records in the block, indicate whether or not the block is sorted, and the value of the first and last key of the first and last records of the block, as discussed above with reference to FIG. 5. The manifest class includes a constructor, declared on line 19, the two add member functions discussed above with to FIGS. 6A and 6B on lines 20 and 21, the split_memory_sort method, on line 23, discussed above with reference to FIG. 7, and the split_merge_sort method, on lines 24-25, discussed above with reference to FIGS. 9A-D. The class manifest also includes a finalized_sort method, declared on line 26, that carries out the final sort of the blocks by first key value in step 1016 of FIG. 10A. The manifest class includes data members, declared on lines 28-30, that include a Boolean value indicating whether or not the blocks of the manifest are sorted, the number of records within the blocks associated with the manifest, and the vector of block_info objects that describe the blocks associated with the manifest, as discussed above with reference to FIG. 5.

Next, a relational function for comparing two blocks is provided:

```
static bool order_by_start(const block_info& f1, const block_info& f2)
{
        if (f1.first_key < f2.first_key)
                return true;
        if (f2.first_key < f1.first_key)
                return false;
        return f1.last_key < f2.last_key;
}
```

The two add function members of the manifest class are next provided without detailed additional comments:

```
void manifest::add(const manifest& other)
{
        if (other.m_sorted != m_sorted)
                throw std::runtime_error("Manifest add sort mismatch");
        m_blocks.insert(m_blocks.end( ), other.m_blocks.begin( ), other.m_blocks.end( ));
```

-continued

```
        m_num_records += other.m_num_records;
}
void manifest::add(const block_info& fi)
{
        if (fi.sorted != m_sorted)
                throw std::runtime_error("Block add sort mismatch");
        m_blocks.push_back(fi);
        this->m_num_records += fi.num_records;
}
```

The blocks of one manifest are appended to the end of another manifest, in the first add operation, and a single block is added to a manifest in the second add function.

Next, the manifest-class member function split_memory_sort is provided:

```
1  void manifest::split_memory_sort(std::vector<singlesort_task>&
      to_sort)
2  {
3      for(size_t i = 0; i < m_blocks.size( ); i++)
4      {
5          singlesort_task st;
6          st.input = m_blocks[i];
7          to_sort.push_back(st);
8      }
9  }
```

In the for-loop of lines 3-8, each block in the manifest incorporated into a single sort task that is added to a vector of single-sort tasks. The split_memory_sort operation is discussed above with reference to FIG. 7.

Next, the manifest-class member function split_merge_sort is provided:

```
1   bool manifest::split_merge_sort(manifest& done, std::vector<mergesort_task>& to_sort,
2   size_t max_merge, size_t block_size)
3   {
4       bool final = true;
5        std::sort(m_blocks.begin( ), m_blocks.end( ), order_by_start);
6       mergesort_task cur_param;
7       cur_param.block_size = block_size;
8       key_t highest_key = key_t( );
9       for(size_t i = 0; i < m_blocks.size( ); i++)
10      {
11          if (cur_param.inputs.size( ) > 0 && highest_key <= m_blocks[i].first_key)
12          {
13              if (cur_param.inputs.size( ) == 1 && cur_param.begin_on == "")
14              {
15                  done.add(cur_param.inputs[0]);
16              }
17              else
18              {
19                  to_sort.push_back(cur_param);
20              }
21              cur_param.inputs.clear( );
22              cur_param.begin_on= key_t( );
23              cur_param.end_before = key_t( );
24              highest_key = key_t( );
25          }
26          else if (cur_param.inputs.size( ) >= max_merge)
27          {
28              size_t count_good = 0;
29              mergesort_task carry_on;
30              carry_on.block_size = block_size;
31              for(size_t j = 0; j < cur_param.inputs.size( ); j++)
32              {
33                  if (cur_param.inputs[j].last_key <= m_blocks[i].first_key)
34                  {
35                      count_good++;
36                  }
37                  else
38                  {
39                      carry_on.inputs.push_back(cur_param.inputs[j]);
```

```
40              }
41          }
42          if (count_good >= (max_merge * 7 / 10))
43          {
44              cur_param.end_before = m_blocks[i].first_key;
45              to_sort.push_back(cur_param);
46              cur_param = carry_on;
47              cur_param.begin_on = m_blocks[i].first_key;
48          }
49          else
50          {
51              to_sort.push_back(cur_param);
52              cur_param.inputs.clear( );
53              cur_param.begin_on = key_t( );
54              highest_key = key_t( );
55              final = false;
56          }
57      }
58      cur_param.inputs.push_back(m_blocks[i]);
59      if (highest_key == key_t( ) || highest_key < m_blocks[i].last_key)
60          highest_key = m_blocks[i].last_key;
61  }
62  if(!cur_param.inputs.empty( ))
63  {
64      if (cur_param.inputs.size( ) == 1)
65      {
66          done.add(m_blocks[m_blocks.size( ) − 1]);
67      }
68      else
69      {
70          to_sort.push_back(cur_param);
71      }
72  }
73  return final;
74 }
```

On line 4, the local variable final discussed above with reference to FIG. 10D, is initialized to "true." On line 5, the blocks within the manifest are sorted by first key value and, secondarily, by last key value using the above-provided order_by_start block-comparison routine. A current merge-sort task, cur_param, is declared on line 6. The local variable highest_key is set to a null value on line 8. Then, in the for-loop of lines 9-61, each block within the manifest is considered, in sorted order, as discussed above with reference to FIG. 10D. The conditional statement on line 11 detects a clean break, which results in either adding the contents of cur_param to a result manifest done, on line 15, when the merge-sort task cur_param has only one entry or results in adding cur_param to a vector of merge-sort tasks to_sort, on line 19, when cur_param includes more than a single block. On lines 21-24, cur_param is reinitialized and the variable highest_key is reset to a null value, as in step 1047 of FIG. 10D. The conditional on line 26 corresponds to step 1048 in FIG. 10D, in which a full cur_param object is detected. In this case, the number of non-overlapping, or good, blocks is counted in the for-loop of steps 33-36. The overlapping blocks are added to a new merge-sort task carry_on in this for-loop, on line 39. When there are only a few overlapping blocks in the data subset, as determined on line 42, then the merge-sort task cur_param is partitioned internally on lines 44-47, as discussed above with reference to FIG. 9D. Otherwise, the blocks in cur_param are added as a merge-sort task to the merge-sort-task vector to_sort on line 51. When this occurs, overlapping blocks will remain in the data set, and therefore, the local variable final is set to "false" on line 55. Otherwise, the currently considered block is added to the merge-sort task cur_param on line 58 and the local variable highest_key may be updated on lines 59-60, as discussed above with reference to FIG. 10D and, in particular, to steps 1055-1056 in FIG. 10D. Lines 62-72 either add a single block remaining in cur_param to the result manifest done, on line 66, or push the blocks in cur_param as a task onto the task vector to_sort on line 70, as discussed with respect to steps 1058, 1060, 1062, and 1064 in FIG. 10D.

Next, an implementation of the manifest-class member function finalize_sort is provided:

```
void manifest::finalize_sort( )
{
    std::sort(m_blocks.begin( ), m_blocks.end( ), order_by_start);
}
```

The merge-sort task, discussed above with reference to FIGS. 8A-K, is embodied in the merge-sort_task and merge_element objects, classes for which are declared as follows:

```
1  class mergesort_task : public task
2  {
3  public:
4      mergesort_task( ) { }
5      std::vettor<block_info> inputs;
6      key_t begin_on;
7      key_t end_before;
8      size_t block_size;
9      manifest run(cloud& c);
10 };
11 struct merge_element
12 {
13     size_t source;
14     key_t k;
15     value_t v;
16 };
```

The merge-sort_task class includes a vector of block_info objects representing a set of blocks to merge sort, declared on line 5, and the begin_on and end_before data members, on lines 6-7, discussed above with reference to FIG. 8A and subsequent figures. The merge_element structure is used for the options data structures discussed above with reference to FIG. 8A, and include a key value and data value declared on lines 14-15. A class manifest_reader, provided below, reads records from blocks being merged by a merge-sort task:

```
class manifest_reader
{
public:
        manifest_reader(const manifest& m, cloud& c);
        bool read(key_t& k, value_t& v);
private:
        const manifest& m_manifest;
        cloud& m_cloud;
        size_t m_cur_block;
        block_reader m_br;
};
```

The merge-sort_task function member "run," which executes a merge sort on a data subset, as discussed above with reference to FIGS. 8A-K, is next provided:

```
1   manifest mergesort_task::run(cloud& c)
2   {
3       manifest out(true);
4       block_info bi;
5       bi.sorted = true;
6       block_writer cur_out = c.write_unique( );
7       bi.oid = cur_out.get_id( );
8       size_t readers_alive = 0;
9       std::vector<block_reader> readers;
10      std::multimap<key_t, merge_element> options;
11      for(size_t i = 0; i < inputs.size( ); i++)
12      {
13          readers.push_back(c.read_block(inputs[i].oid));
14          merge_element e;
15          if (readers[i].read(e.k, e.v))
16          {
17              e.source = i;
18              options.insert(std::make_pair(e.k, e));
19              readers_alive++;
20          }
21      }
22      while(readers_alive > 0)
23      {
24          std::multimap<key_t, merge_element>::iterator it;
25          it = options.begin( );
26          merge_element o = it->second;
27          options.erase(it);
28          merge_element e;
29          if (readers[o.source].read(e.k, e.v))
30          {
31              e.source = o.source;
32              options.insert(std::make_pair(e.k, e));
33          }
34          else
35              readers_alive--;
36          if (begin_on != key_t( ) && o.k < begin_on)
37              continue;
38          if (end_before != key_t( ) && !(o.k < end_before))
39              continue;
40          cur_out.write(o.k, o.v);
41          if (bi.first_key == key_t( ))
42              bi.first_key = o.k;
43          bi.last_key = o.k;
44          bi.num_records++;
45          if (bi.num_records== block_size)
46          {
47              cur_out.close( );
48              out.add(bi);
49              cur_out = c.write_unique( );
50              bi.oid = cur_out.get_id( );
51              bi.first_key = key_t( );
52              bi.last_key = key_t( );
53              bi.num_records = 0;
54          }
55      }
56      cur_out.close( );
57      if (bi.num_records > 0)
58          out.add(bi);
59      return out;
60  }
```

A result manifest out is declared on line 3. A vector of readers is declared on line 9 for reading records from the blocks that are being merge sorted. The options data structures, discussed above with respect to FIG. 8A, are declared on line 10. In the for-loop of lines 11-21, the options data structures are filled with records from the input blocks, as discussed above with reference to FIG. 8B. Then, in the while-loop of lines 22-55, records are written to the current output block cur_out and replacement records are read into the options data structures from the input blocks.

The single sort task used for the in-memory sorting of each block in the first cycle of a cloud merge sort is next provided, without detailed explanation:

```
1   class singlesort_task : public task
2   {
3   public:
4       singlesort_task( ) { }
5       block_info input;
6       manifest run(cloud& c);
7   };
8   manifest singlesort_task::run(cloud& c)
9   {
10      std::vector<std::pair<key_t, value_t> > in_memory;
11      block_reader r = c.read_block(input.oid);
12      key_t k;
13      value_t v;
14      while(r.read(k,v))
15          in_memory.push_back(std::make_pair(k,v));
16      std::sort(in_memory.begin( ), in_memory.end( ));
17      block_info bi;
18      bi.sorted = true;
19      bi.first_key = in_memory[0].first;
20      bi.last_key = in_memory[in_memory.size( ) - 1].first;
21      bi.num_records = in_memory.size( );
22      block_writer w = c.write_unique( );
23      bi.oid = w.get_id( );
24      for(size_t i = 0; i < in_memory.size( ); i++)
25          w.write(in_memory[i].first, in_memory[i].second);
26      w.close( );
27      manifest m(true);
28      m.add(bi);
29      return m;
30  }
```

The in-memory sort is carried out on line 16 and the block_info object that describes the sorted block is updated on lines 17-21. Finally, simulation code for the cloud-computing environment is provided without further discussion:

```
class cloud;
class block_reader
{
        friend class cloud;
public:
        const object_id& get_id( ) { return m_oid; }
        bool read(key_t& k, value_t& v);
private:
        block_reader(const object_id& oid, const std::vector<kvp_t>& kvps);
        object_id m_oid;
        const std::vector<kvp_t>* m_kvps;
        size_t m_current;
};
class block_writer
{
        friend class cloud;
public:
        const object_id& get_id( ) { return m_oid; }
        void write(key_t& k, value_t& v);
        void close( );
private:
        block_writer(const object_id& oid, std::vector<kvp_t>& kvps);
        object_id m_oid;
        std::vector<kvp_t>* m_kvps;
};
class cloud
{
public:
        cloud( );
        block_writer write_unique( );
        // Starts reading a block based on it's id
        block_reader read_block(const object_id& id);
private:
        size_t m_next_id;
        std::map<object_id, std::vector<kvp_t> > m_blocks;
};
block_reader::block_reader(const object_id& oid, const std::vector<kvp_t>& kvps)
        : m_oid(oid)
        , m_kvps(&kvps)
        , m_current(0)
{ }
bool block_reader::read(key_t& k, value_t& v)
{
        if (m_current == m_kvps->size( )) return false;
        k = (*m_kvps)[m_current].first;
        v = (*m_kvps)[m_current].second;
        m_current++;
        return true;
}
block_writer::block_writer(const object_id& oid, std::vector<kvp_t>& kvps)
        : m_oid(oid)
        , m_kvps(&kvps)
{ }
void block_writer::write(key_t& k, value_t& v)
{
        (*m_kvps).push_back(std:make_pair(k, v));
}
void block_writer::close( )
{
}
cloud::cloud( )
        : m_next_id(0)
{ }
block_writer cloud::write_unique( )
{
        char buf[50];
        sprintf(buf, "object_%d", (int) m_next_id++);
        std::string oid = std::string(buf);
        return block_writer(oid, m_blocks[oid]);
}
block_reader cloud::read_block(const object_id& oid)
{
        return block_reader(oid, m_blocks[oid]);
}
```

The following classes block_reader, block_writer, and cloud simulate a cloud-computing environment. The member functions of these classes allow a block of records to be written to the simulated data-storage subsystem and read from the simulated data-storage subsystem of the simulated cloud-computing environment. This code is provided for the sake of completeness, but is not directed to implementation of the cloud merge sort:

Finally, the main routine for cloud merge sort is provided:

```
1   int main( )
2   {
3       size_t block_size = 10;
4       size_t max_merge = 10;
5       size_t row_count = 10000;
6       cloud c;
7       manifest m(false);
8       block_info bi;
9       bi.sorted = false;
10      block_writer bw = c.write_unique( );
11      bi.oid = bw.get_id( );
12      std::vector<std::pair<key_t, value_t> > verify;
13      for(size_t i = 0; i < row_count; i++)
14      {
15          key_t k;
16          value_t v;
17          for(size_t j = 0; j < 10; j++)
18          {
19              k.push_back('a' + rand( ) % 26);
20              v.push_back('a' + rand( ) % 26);
21          }
22          bw.write(k, v);
23          bi.num_records++;
24          if (bi.num_records == block_size)
25          {
26              bw.close( );
27              m.add(bi);
28              bi.num_records = 0;
29              bw = c.write_unique( );
30              bi.oid = bw.get_id( );
31          }
32          verify.push_back(std::make_pair(k, v));
33      }
34      bw.close( );
35      if (bi.num_records != 0)
36          m.add(bi);
37      std::vector<singlesort_task> subtasks;
38      m.split_memory_sort(subtasks);
39      m = manifest(true);
40      printf("Doing parallel in memory sort\n");
41      for(size_t i = 0; i < subtasks.size( ); i++)
42          m.add(subtasks[i].run(c));
43      bool last;
44      do {
45          printf("Doing round of parallel merge sorts\n");
46          manifest m2(true);
47          std::vector<mergesort_task> subtasks2;
48          last = m.split_merge_sort(m2, subtasks2, max_merge, block_size);
49          for(size_t i = 0; i < subtasks2.size( ); i++)
50              m2.add(subtasks2[1].run(c));
51          m = m2;
52      } while(!last);
53      m.finalize_sort( );
54      std::sort(verify.begin( ), verify.end( ));
55      printf("Validating results\n");
56      size_t i = 0;
57      manifest_reader mr(m,c);
58      key_t k;
59      value_t v;
60      while(mr.read(k,v))
61      {
62          if (verify[i].first != k || verify[i].second != v)
63          {
64              printf("MISMATCH\n");
65              return 1;
66          }
67          i++;
68      }
69      if (i != verify.size( ))
70      {
71          printf("Missing records\n");
72          while(mr.read(k,v))
73          {
74              if (verify[i].first != k || verify[i].second != v)
75              {
76                  printf("MISMATCH\n");
77                  return 1;
78              }
79              i++;
80          }
81          if (i != verify.size( ))
82          {
83              printf("Missing records\n");
84              return 1;
85          }
86      return 0;
87  }
```

An instance of the class cloud is declared on line 6. On lines 7-36, a large number of records is constructed to generate a simulated data set. On lines 37-38, the manifest-class member function split_memory_sort is used to carry out the first fan-out operation. The sorting of individual blocks is carried out on lines 41-42. The do-while loop of lines 44-52 carry out the remaining cycles of the cloud merge sort, with the fan-out for each of the subsequent cycles carried out by lines 47-48, using the manifest-class member function split_merge_sort, and the merge sorts carried out in the for-loop of lines 49-50. The final sort, in which all of the non-overlapping blocks are sorted by first key value, is carried out on line 53. The remaining code is used to verify that the cloud merge sort produced a correct sorted data set.

Although the present invention has been described in terms of particular embodiments, it is not intended that the invention be limited to these embodiments. Modifications within the spirit of the invention will be apparent to those skilled in the art. For example, any of many different implementations of the cloud merge sort can be obtained by varying any of many different design and implementation parameters, including programming language, underlying operating system, data structures, control structures, modular organization, cloud-computing-environment interface, and other such parameters. As mentioned above, the cloud merge sort may sort a data set on one or multiple dimensions depending on implementation of the relational operator used to compare key values of records with one another. In addition, the cloud merge sort may sort data records in ascending order, descending order, or in more complex ways depending on the implementation of the relational operator. Cloud merge sort can be tailored for execution in any of many different types of distributed-computing environments, including many different types of cloud-computing environments.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A merge-sort system comprising:
   a distributed computing environment, implemented on multiple physical computer systems, that provides computational resources for execution of tasks and that provides a virtual data-storage subsystem for storing and retrieving data objects; and
   computer instructions, encoded in one or more physical data-storage devices, that control the distributed computing environment to:
   receive an indication of a number of data objects stored within the distributed computing environment, wherein:
      each data object includes multiple records, and
      each record comprises a key and a data value;
   distribute tasks to computational resources within the distributed computing environment where the tasks are executed, wherein:
      each task is associated with a data object, and
      each task sorts the records of the data object associated with the task by key value; and
   while a range of key values in any data object of the number of data objects overlaps with a range of key values in any other data object of the number of data objects, distribute tasks to computational resources within the distributed computing environment where the tasks are executed, wherein:
      each task is associated with a subset of the data objects, and
      each task merge sorts the records of the subset of the data objects associated with the task by key value.

2. The merge-sort system of claim 1 wherein the number of data objects and subsets of the number of data objects are represented by manifest objects, each manifest object including a set of one or more block-information objects, each block-information object representing a data object and including an identifier for the data object, a key value of a first record contained in the data object, and a key value of a last record contained in the data object.

3. The merge-sort system of claim 2 wherein the distributed computing system, after receiving the indication of the number of data objects stored within the distributed computing environment, represents the number of data objects by a manifest object.

4. The merge-sort system of claim 3 wherein the distributed computing system distributes the tasks associated with data objects to computational resources for sorting the records within the data objects by:
   representing each data object in a separate manifest object;
   associating each separate manifest object with a record-sorting task which reads, from a data-storage subsystem of the distributed computing system, the data object referenced by the manifest, sorts the records of the data object in memory, and writes the sorted data object back to the data-storage subsystem of the distributed computing system; and
   following execution of the record-sorting tasks, reassembling the separate manifest objects into a single, result manifest object.

5. The merge-sort system of claim 3 wherein the distributed computing system distributes the tasks associated with data objects to computational resources for sorting the records within the data objects by:
   partitioning a result manifest object that represents the number of data objects into separate manifest objects that each represent a subset of the data objects;
   associating each separate manifest object with a merge-sort task which reads, from a data-storage subsystem of the distributed computing system, the data objects referenced by a manifest object, merge-sorts the records of the data objects into result data objects, writes the result data objects back to the data-storage subsystem of the distributed computing system, and generates a separate result manifest object that references the result data objects; and
   following execution of the merge-sort tasks, reassembling the separate result manifests into a single, result manifest.

6. The merge-sort system of claim 2 wherein, when a range of key values in no data object of the number of data objects overlaps with a range of key values in any other data object of the number of data objects, the distributed computing system sorts the block-information objects within a final, result manifest object to produce a representation of a set of data objects in which the records are sorted by key value.

7. The merge-sort system of claim 6 wherein the final manifest object that represents a set of data objects in which the records are sorted by key value, represents a set of data objects in which the records are sorted by key value with respect to one of:
   a single sort dimension; and
   multiple sort dimensions.

8. The merge-sort system of claim 6 wherein the final, result manifest object that represents of a set of data objects in which the records are sorted by key value represents a set of data objects in which the records are sorted in one of:
   ascending order;
   descending order; and
   a complex order defined by a relational operator.

9. A method in a distributed computing environment, implemented on multiple physical computer systems, that provides computational resources for execution of tasks and that provides a virtual data-storage subsystem for storing and retrieving data objects, the method comprising:
   receiving an indication of a number of data objects stored within the distributed computing environment, wherein:
      each data object includes multiple records, and
      each record comprises a key and a data value;
   distributing tasks to computational resources within the distributed computing environment where the tasks are executed, wherein:
      each task is associated with a data object, and
      each task sorts the records of the data object associated with the task by key value; and
   while a range of key values in any data object of the number of data objects overlaps with a range of key values in any other data object of the number of data objects, distributing tasks to computational resources within the distributed computing environment where the tasks are executed, wherein:
      each task is associated with a subset of the data objects, and
      each task merge sorts the records of the subset of the data objects associated with the task by key value.

10. The method of claim 9 further comprising representing the number of data objects and subsets of the number of data objects by manifest objects, each manifest object including a set of one or more block-information objects, each block-information object representing a data object and including an identifier for the data object, a key value of a first record contained in the data object, and a key value of a last record contained in the data object.

11. The method of claim 10 further including, after receiving the indication of the number of data objects stored within the distributed computing environment, representing the number of data objects by a manifest object.

12. The method of claim 11 further including distributing the tasks associated with data objects to computational resources for sorting the records within the data objects by:
representing each data object in a separate manifest object,
associating each separate manifest object with a record-sorting task which reads, from a data-storage subsystem of the distributed computing system, the data object referenced by the manifest, sorts the records of the data object in memory, and writes the sorted data object back to the data-storage subsystem of the distributed computing system; and
following execution of the record-sorting tasks, reassembling the separate manifest objects into a single, result manifest object.

13. The method of claim 11 further including distributing the tasks associated with data objects to computational resources for sorting the records within the data objects by:
partitioning a result manifest object that represents the number of data objects into separate manifest objects that each represent a subset of the data objects;
associating each separate manifest object with a merge-sort task which reads, from a data-storage subsystem of the distributed computing system, the data objects referenced by a manifest object, merge-sorts the records of the data objects into result data objects, writes the result data objects back to the data-storage subsystem of the distributed computing system, and generates a separate result manifest object that references the result data objects; and
following execution of the merge-sort tasks, reassembling the separate result manifests into a single, result manifest.

14. The method of claim 10 further including:
when a range of key values in no data object of the number of data objects overlaps with a range of key values in any other data object of the number of data objects,
sorting the block-information objects within a final, result manifest object to produce a representation of a set of data objects in which the records are sorted by key value.

15. The method of claim 14 wherein the final manifest object that represents a set of data objects in which the records are sorted by key value, represents a set of data objects in which the records are sorted by key value with respect to one of:
a single sort dimension; and
multiple sort dimensions.

16. The method of claim 14 wherein the final, result manifest object that represents of a set of data objects in which the records are sorted by key value represents a set of data objects in which the records are sorted in one of:
ascending order;
descending order; and
a complex order defined by a relational operator.

* * * * *